(12) United States Patent
Tessmer et al.

(10) Patent No.: US 11,310,150 B2
(45) Date of Patent: *Apr. 19, 2022

(54) CONNECTIVITY SEGMENT COLORING

(71) Applicant: Nicira, Inc., Palo Alto, CA (US)

(72) Inventors: Alexander Tessmer, Mountain View, CA (US); Ram Dular Singh, Cupertino, CA (US); Ganesan Chandrashekhar, Campbell, CA (US)

(73) Assignee: NICIRA, INC., Palo Alto, CA (US)

( * ) Notice: Subject to any disclaimer, the term of this patent is extended or adjusted under 35 U.S.C. 154(b) by 940 days.

This patent is subject to a terminal disclaimer.

(21) Appl. No.: 15/442,073

(22) Filed: Feb. 24, 2017

(65) Prior Publication Data

US 2017/0171061 A1    Jun. 15, 2017

Related U.S. Application Data

(63) Continuation of application No. 14/133,524, filed on Dec. 18, 2013, now Pat. No. 9,602,392.

(51) Int. Cl.
*H04L 12/761* (2013.01)
*H04L 12/46* (2006.01)
(Continued)

(52) U.S. Cl.
CPC ............ *H04L 45/16* (2013.01); *H04L 12/462* (2013.01); *H04L 12/4633* (2013.01); *H04L 12/4641* (2013.01); *H04L 45/02* (2013.01)

(58) Field of Classification Search
None
See application file for complete search history.

(56) References Cited

U.S. PATENT DOCUMENTS

| 5,224,100 A | 6/1993 | Lee et al. |
|---|---|---|
| 5,331,634 A | 7/1994 | Fischer |

(Continued)

FOREIGN PATENT DOCUMENTS

| CN | 101119578 A | 2/2008 |
|---|---|---|
| CN | 101783734 A | 7/2010 |

(Continued)

OTHER PUBLICATIONS

Casado, Martin, et al. "Ethane: Taking Control of the Enterprise," SIGCOMM'07, Aug. 27-31, 2007, pp. 1-12, ACM, Kyoto, Japan.

(Continued)

*Primary Examiner* — Noel R Beharry
*Assistant Examiner* — Rodrick Mak
(74) *Attorney, Agent, or Firm* — Adeli LLP

(57) ABSTRACT

A novel method for fully utilizing the multicast or broadcast capability of a physical network is provided. The method identifies segments of the network within which broadcast traffic, multicast traffic, or traffic to unknown recipients (BUM traffic) is allowed or enabled. The identified segment encompasses parts of the network that the BUM traffic is able reach while excluding parts of the network nodes that the BUM traffic is unable to reach. Each identified segment includes network nodes that are interconnected by physical network hardware that supports BUM traffic. The method identifies multiple BUM traffic segments in a given network that each supports its own BUM traffic. The different BUM traffic segments are interconnected by physical network hardware that does not support BUM network traffic. Each identified segment is assigned an identifier that uniquely distinguishes the identified segment from other identified segments.

21 Claims, 17 Drawing Sheets

(51) Int. Cl.
*H04L 12/751* (2013.01)
*H04L 45/16* (2022.01)
*H04L 45/02* (2022.01)

(56) References Cited

U.S. PATENT DOCUMENTS

| | | | |
|---|---|---|---|
| 5,729,685 | A | 3/1998 | Chatwani et al. |
| 5,831,975 | A | 11/1998 | Chen et al. |
| 5,926,463 | A | 7/1999 | Ahearn et al. |
| 6,018,526 | A * | 1/2000 | Liu .................... H04L 63/0236 370/401 |
| 6,104,699 | A | 8/2000 | Holender et al. |
| 6,181,697 | B1 | 1/2001 | Nurenberg et al. |
| 6,192,417 | B1 | 2/2001 | Block et al. |
| 6,728,777 | B1 | 4/2004 | Lee et al. |
| 6,804,263 | B1 | 10/2004 | Okawa |
| 6,836,481 | B1 | 12/2004 | Hotta |
| 6,862,263 | B1 | 3/2005 | Simmons |
| 6,901,510 | B1 | 5/2005 | Srivastava |
| 6,917,985 | B2 | 7/2005 | Madruga et al. |
| 6,934,252 | B2 | 8/2005 | Mehrotra et al. |
| 6,950,428 | B1 | 9/2005 | Horst et al. |
| 7,046,630 | B2 | 5/2006 | Abe et al. |
| 7,209,439 | B2 | 4/2007 | Rawlins et al. |
| 7,286,490 | B2 | 10/2007 | Saleh et al. |
| 7,333,487 | B2 | 2/2008 | Novaes |
| 7,529,199 | B1 | 5/2009 | Wijnands et al. |
| 7,606,187 | B2 | 10/2009 | Zeng et al. |
| 7,792,099 | B2 | 9/2010 | Yasukawa et al. |
| 7,792,987 | B1 | 9/2010 | Vohra et al. |
| 7,813,340 | B2 | 10/2010 | Novaes |
| 7,876,754 | B2 | 1/2011 | Novaes |
| 7,937,438 | B1 | 5/2011 | Miller et al. |
| 7,961,646 | B2 | 6/2011 | Liu et al. |
| 8,089,964 | B2 | 1/2012 | Lo et al. |
| 8,223,649 | B2 | 7/2012 | Rangarajan et al. |
| 8,224,971 | B1 | 7/2012 | Miller et al. |
| 8,310,957 | B1 | 11/2012 | Rekhter |
| 8,312,129 | B1 | 11/2012 | Miller et al. |
| 8,391,185 | B2 | 3/2013 | Wijnands et al. |
| 8,553,689 | B2 | 10/2013 | Bachmann et al. |
| 8,612,627 | B1 | 12/2013 | Brandwine |
| 8,625,603 | B1 | 1/2014 | Ramakrishnan et al. |
| 9,432,204 | B2 | 8/2016 | Shen et al. |
| 9,602,385 | B2 | 3/2017 | Tessmer et al. |
| 9,602,392 | B2 | 3/2017 | Tessmer et al. |
| 9,794,079 | B2 | 10/2017 | Tessmer et al. |
| 9,887,851 | B2 | 2/2018 | Shen et al. |
| 10,103,980 | B1 * | 10/2018 | Tiwari ................ H04L 45/66 |
| 2002/0138618 | A1 | 9/2002 | Szabo |
| 2004/0267897 | A1 | 12/2004 | Hill et al. |
| 2005/0111474 | A1 | 5/2005 | Kobayashi |
| 2005/0147095 | A1 | 7/2005 | Guerrero et al. |
| 2006/0045092 | A1 * | 3/2006 | Kubsch .................. H04L 29/06 370/395.3 |
| 2006/0182033 | A1 | 8/2006 | Chen et al. |
| 2006/0187950 | A1 | 8/2006 | Bou-Diab et al. |
| 2006/0239290 | A1 | 10/2006 | Lin et al. |
| 2007/0058638 | A1 * | 3/2007 | Guichard ............ H04L 12/4641 370/395.31 |
| 2007/0253409 | A1 | 11/2007 | Fu et al. |
| 2008/0002727 | A1 | 1/2008 | Yamane |
| 2008/0020758 | A1 | 1/2008 | Nagarajan et al. |
| 2008/0059556 | A1 | 3/2008 | Greenspan et al. |
| 2008/0071900 | A1 | 3/2008 | Hecker et al. |
| 2008/0104273 | A1 | 5/2008 | Bruck et al. |
| 2008/0175239 | A1 | 7/2008 | Sistanizadeh et al. |
| 2008/0186962 | A1 | 8/2008 | Sinha |
| 2008/0205302 | A1 | 8/2008 | Florit et al. |
| 2008/0212496 | A1 | 9/2008 | Zou |
| 2009/0285206 | A1 * | 11/2009 | Kawauchi ............ H04L 12/462 370/389 |
| 2010/0002698 | A1 | 1/2010 | Clack et al. |
| 2010/0106779 | A1 | 4/2010 | Yamauchi |
| 2010/0157888 | A1 | 6/2010 | Aggarwal et al. |
| 2010/0157889 | A1 | 6/2010 | Aggarwal et al. |
| 2010/0271948 | A1 * | 10/2010 | Challapali ............ H04W 72/085 370/235 |
| 2010/0284402 | A1 | 11/2010 | Narayanan |
| 2011/0022652 | A1 | 1/2011 | Lai et al. |
| 2011/0075664 | A1 | 3/2011 | Lambeth et al. |
| 2011/0188500 | A1 | 8/2011 | Du |
| 2011/0202920 | A1 | 8/2011 | Takase |
| 2011/0280572 | A1 | 11/2011 | Vobbilisetty et al. |
| 2011/0317696 | A1 | 12/2011 | Aldrin et al. |
| 2012/0106950 | A1 | 5/2012 | Madrahalli et al. |
| 2012/0155322 | A1 | 6/2012 | Lamba et al. |
| 2012/0177042 | A1 | 7/2012 | Berman |
| 2012/0185553 | A1 * | 7/2012 | Nelson .................... H04L 67/10 709/209 |
| 2012/0233326 | A1 | 9/2012 | Shaffer et al. |
| 2012/0236734 | A1 | 9/2012 | Sampath et al. |
| 2012/0254943 | A1 * | 10/2012 | Li ........................ H04L 9/3213 726/3 |
| 2012/0278804 | A1 | 11/2012 | Narayanasamy et al. |
| 2012/0307826 | A1 | 12/2012 | Matsuoka |
| 2013/0040677 | A1 | 2/2013 | Lee et al. |
| 2013/0114597 | A1 | 5/2013 | Ogisawa et al. |
| 2013/0124750 | A1 | 5/2013 | Anumala et al. |
| 2013/0159826 | A1 | 6/2013 | Mason et al. |
| 2013/0266015 | A1 | 10/2013 | Qu et al. |
| 2013/0318219 | A1 | 11/2013 | Kancherla |
| 2014/0052877 | A1 | 2/2014 | Mao |
| 2014/0092907 | A1 | 4/2014 | Sridhar et al. |
| 2014/0098814 | A1 | 4/2014 | Bansal et al. |
| 2014/0169366 | A1 | 6/2014 | Kotalwar et al. |
| 2014/0192804 | A1 | 7/2014 | Ghanwani et al. |
| 2014/0195666 | A1 | 7/2014 | Dumitriu et al. |
| 2014/0243035 | A1 * | 8/2014 | Jung ...................... H04W 4/08 455/519 |
| 2014/0372624 | A1 | 12/2014 | Wang et al. |
| 2015/0016300 | A1 | 1/2015 | Devireddy et al. |
| 2015/0055651 | A1 | 2/2015 | Shen et al. |
| 2015/0131655 | A1 | 5/2015 | Dayama et al. |
| 2015/0147095 | A1 | 5/2015 | Iketani |
| 2015/0163100 | A1 | 6/2015 | Graf et al. |
| 2015/0172132 | A1 | 6/2015 | Tessmer et al. |
| 2015/0172165 | A1 | 6/2015 | Tessmer et al. |
| 2015/0254190 | A1 * | 9/2015 | Yang .................... G06F 9/44505 710/8 |
| 2015/0263862 | A1 | 9/2015 | Sugyou et al. |
| 2015/0381484 | A1 | 12/2015 | Hira et al. |
| 2016/0119156 | A1 | 4/2016 | Drake et al. |
| 2016/0352531 | A1 | 12/2016 | Shen et al. |
| 2018/0048478 | A1 | 2/2018 | Tessmer et al. |
| 2018/0159696 | A1 | 6/2018 | Shen et al. |
| 2018/0212788 | A1 | 7/2018 | Iszlai et al. |

FOREIGN PATENT DOCUMENTS

| | | |
|---|---|---|
| CN | 101282338 B | 8/2011 |
| EP | 1855420 | 11/2007 |
| GB | 2458154 A | 9/2009 |
| JP | 2001-230774 | 8/2001 |
| JP | 2005184234 A | 7/2005 |
| JP | 2006121517 A | 5/2006 |
| JP | 2006-229967 | 8/2006 |
| JP | 2009-272803 | 11/2009 |
| JP | 2010-103757 | 5/2010 |
| JP | 2011171874 A | 9/2011 |
| JP | 2015531212 A | 10/2015 |
| WO | 2004082221 A1 | 9/2004 |
| WO | WO 2006/095391 | 9/2006 |
| WO | WO 2013/009850 | 1/2013 |
| WO | 2013078979 A1 | 6/2013 |
| WO | 2014087591 A1 | 6/2014 |

OTHER PUBLICATIONS

Casado, Martin, et al., "SANE: A Protection Architecture for Enterprise Networks," Proceedings of the 15*th* USENIX Security Symposium, Jul. 31, 2006, pp. 1-15.

(56) References Cited

OTHER PUBLICATIONS

Dumitriu, Dan Mihai, et al. (U.S. Appl. No. 61/514,990), filed Aug. 4, 2011.
Gross, J., et al., "Geneve: Generic Network Virtualization Encapsulation," Feb. 14, 2014, 24 pages, Internet Engineering Task Force (IETF).
Narten, Thomas, et al., "Address Resolution Problems in Large Data Center Networks," Jan. 2013, 17 pages, Internet Engineering Task Force (IETF).

* cited by examiner

CONNECTIVITY SEGMENT COLORING

BACKGROUND

Multicast is the delivery of a message or information to a group of destination computers simultaneously in a single transmission from the source. Copies of the message are automatically replicated and forwarded by other network elements. Forwarding and replicating multicast packets are usually done by intermediate nodes in the network— switches fulfill multicast forwarding inside a layer 2 network while (multicast) routers fulfill multicast routing across layer 3 networks. Typically, switches that support multicast use IGMP (Internet Group Management Protocol) snooping, while routers that support multicast use PIM (Protocol Independent Multicast) as the routing protocol.

Though previously not very many applications use multicast, many IP multicast applications have been developed and deployed like financial software, video service, etc. A use case worth noting is overlay based network virtualization (layer 2 tunneling), with VXLAN to be an important technology proposed. VXLAN can support a large number of logical layer 2 networks over a physical IP network. It is based on MAC-over-UDP encapsulation, and requires an IP multicast group to be allocated for encapsulation of BUM (broadcast, unknown unicast, and multicast) traffic inside a logical network. As a result, a large number of multicast groups may be consumed, especially in a cloud environment in which each tenant may create a number of logical networks. These created logical networks and corresponding multicast groups may span across physical layer 3 networks and even datacenters.

Unfortunately, use of IP multicast is limited by lack of infrastructure to support it. Low end switches and routers usually do not support IGMP and PIM, or they do not support a large number of multicast groups. Moreover, even when the physical network hardware has the capabilities to support multicast, users generally eschew enabling multicast in the datacenter networks due to the complexity in the manageability and the scalability of IP multicast. Enabling multicast across datacenters and provider networks is even more difficult.

What is needed is a network system that is able to fully exploit the multicast capability provided by the physical network hardware when and where such capability is available. Such a network system should distinguish segments of the physical network that supports multicast from those that do not so the system knows where multicast is supported. The network should also dynamically detect actual network configuration and underlying topology so the network system can rely on multicast capability when it becomes available.

SUMMARY

In order to fully utilize the multicast or broadcast capability of the network, some embodiments identify segments of the network within which broadcast traffic, unknown unicast, and multicast traffic, or traffic to unknown recipients (BUM traffic) is allowed or enabled. In some embodiments, the identified segment encompasses parts of the network that the BUM traffic is able reach while excluding parts of the network nodes that the BUM traffic is unable to reach. In some embodiments, each identified segment includes network nodes that are interconnected by physical network hardware that supports BUM traffic. Some embodiments identify multiple BUM traffic segments in a given network that each supports its own BUM traffic. The different BUM traffic segments are interconnected by physical network hardware that does not support BUM network traffic in some embodiments. In some embodiments, each identified segment is assigned an identifier that uniquely distinguishes the identified segment from other identified segments.

Some embodiments utilize the connectivity provided by the particular protocol to detect which network elements can be reached by the particular type of connectivity. Network elements reachable by the connectivity are recognized as being in a common connectivity segment and assigned a connectivity segment identifier (CSID). All network elements having a same CSID must have connectivity with each other under the particular protocol (e.g., broadcast, multicast connectivity under Ethernet protocol), while any two network elements having differing CSIDs must not have the connectivity under the particular protocol.

Some embodiments perform a segment coloring operation that elects a particular network element as the "assignor" for setting the CSID of a connectivity segment. In some embodiments, this election process is performed by the network elements in communication with each other by using the particular type of connectivity over the physical network. Each network element collects information about other network elements from these communications and the collected information are in turn used by each network element to determine if it should make itself the assignor for determining the CSID. In some embodiments, these communications are in the forms of query and/or response messages for CSIDs.

In some embodiments, the identification of connectivity segment is a dynamic process that continuously detects any changes to the connectivity segments and updates the definition of each connectivity segments accordingly. Network nodes in some embodiments periodically sends gratuitous messages for detecting changes in a connectivity in the network by detecting mismatches between the CSID in the gratuitous response message and the CSID in the recipient network element. The connectivity segment is redefined to reflect changes in the connectivity in the network when at least some of the network elements change their own CSID based on the received gratuitous responses.

In some embodiments, a given network element uses the CSIDs to identify connectivity segments in the network. Network elements having the same CSID as the given network element are recognized as being in the local segment of the given network element, while network element having other CSIDs are recognized as being in remote segments. To forward multicast traffic to remote segments, the given network element in some embodiments selects a network element from each of the remote segments as multicast proxy and forwards a multicast packet to each of the selected proxies. Each selected proxy in turn uses the inherent support for BUM traffic of its corresponding remote segment to replicate the and forward the multicast packet with that remote segment.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

In order to fully utilize the multicast or broadcast capability of the network, some embodiments identify segments of the network within which broadcast traffic, unknown unicast, or multicast traffic (BUM traffic) is allowed or enabled. In some embodiments, the identified segment encompasses parts of the network that the BUM traffic is able reach while excluding parts of the network nodes that the BUM traffic is unable to reach. In some embodiments, each identified segment includes network nodes that are interconnected by physical network hardware that supports BUM traffic. Some embodiments identify multiple BUM traffic segments in a given network that each supports its own BUM traffic. The different BUM traffic segments are interconnected by physical network hardware that does not support BUM network traffic in some embodiments. In some embodiments, each identified segment is assigned an identifier that uniquely distinguishes the identified segment from other identified segments.

Figure 1:
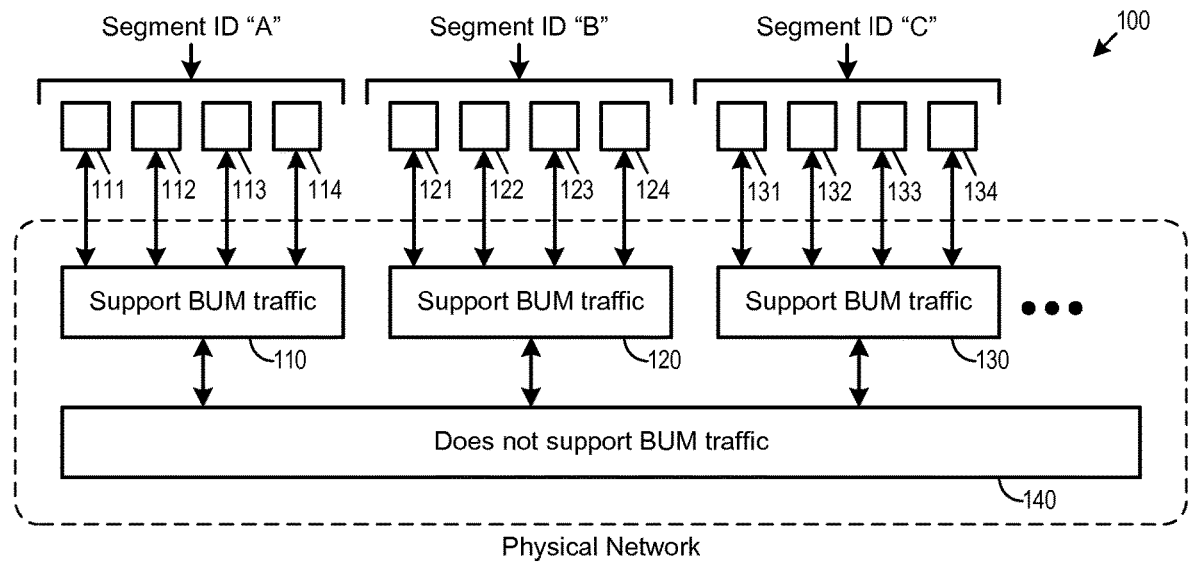
FIG. 1 illustrates a network that includes several BUM traffic segments.

FIG. 1 illustrates a network 100 that includes several BUM traffic segments 110, 120, and 130. The underlying physical hardware of the network 100 supports BUM traffic within each of the BUM segments but not between different BUM segments. As illustrated, the BUM segment 110 includes network elements 111-114, the BUM segment 120 includes network elements 121-124, and the BUM segment 130 includes network elements 131-134. The BUM segments 110, 120, and 130 are interconnected by a network segment 140 that does not support BUM traffic.

The network 100 provides the physical infrastructure for data communication between entities or nodes that are connected to the network 100. In some embodiments, the network 100 includes numerous physically distinct sets of communication pathways that are communicatively interlinked to form the network 100. In some embodiments, at least some of these physically distinct sets of communication pathways have different topologies and/or use different communication protocols. In some embodiments, the network 100 spans across one or more data centers and/or (internet service) provider networks such that at least some of the physically distinct sets of communication pathways are in the data centers or provider networks. In some embodiments, the network 100 is a physical IP network that may be divided into multiple physical layer 2's (VLANs), IP subnets, and multicast islands. Multicast forwarding is supported inside a multicast island, but is not supported (or could not be done at good enough performance) across islands.

In some embodiments, a BUM segment is defined by the multicast or broadcast capabilities of the physical network. In some of these embodiments, BUM traffic within a segment can reliably utilize the multicast capability of the physical network, while BUM traffic across segments are either not supported by the physical network at all or are supported in a more limited fashion. BUM messages are replicated and forwarded differently among network elements of a same segment than between network elements across different segments. For example, in some embodiments, cost of network communication between network elements of a same segment is less than between network elements in different segments. In some embodiments, the network supports higher communication bandwidth between network elements of a same segment than between network elements in different segments.

The network elements 111-114, 121-124, and 131-134 in some embodiments include network entities or nodes capable of consuming, generating, or forwarding network traffic. Such entities can be a computing device, data storage, or a device of another type that provides or consumes data traffic on the network. In some embodiments, the network elements include host machines operating virtualization software or hypervisors that each support one or more virtual machines (VMs). In some embodiments, at least some of the network elements are encapsulation/overlay network tunnel endpoints (such as VXLAN tunnel endpoints, or VTEP). An encapsulation/overlay network tunnel endpoint that replicates and forwards messages to multiple recipients is referred to as a multicast endpoint.

Each of the BUM segments 110, 120, and 130 supports BUM traffic by allowing one-to-many communications between the network elements in the segment. In other words, the network components in the BUM segments (e.g., physical router and switches, etc.) support sending network traffic from one sender to multiple recipients at the same time. In some embodiments, a BUM segment supports the use of broadcast address or multicast group identifier as destination address, which does not specify any particular recipient. A packet bearing a broadcast address as destination will be forwarded to all network elements in the BUM segment, while a packet bearing a multicast group identifier will be forwarded to all network elements belonging to the multicast group within the BUM segment.

In some embodiments, a BUM segment allows multicast forwarding to take place within its boundary but not beyond. For example, a broadcast or multicast packet generated from with the segment 110 can only reach network elements 111-014 but not any of the network elements 121-124 or 131-134. In some embodiments, a multicast group may include network elements in different BUM segments, for example, the network element 111 in the segment 110 and the network element 134 in the segment 130. However, a packet from the network element 111 cannot reach the network element 134 by using one-to-many multicast communications, because they are in different multicast islands separated by physical network infrastructures that do not support multicast. To send the content of the multicast packet from the BUM segment 110 to the BUM segment 130, some embodiments use unicast communication to specified recipients to send the data across the non-multicast segment 140.

The non-multicast segment 140 refers to the physical network infrastructure that interconnects the different BUM segments but does not support BUM traffic itself, or does so in a more limited fashion. In some embodiments, the non-multicast segment 140 includes low end switches and routers that do not support multicast capable protocols such as IGMP and PIM, or they do not support a large number of multicast groups. In some embodiments, the underlying physical infrastructure of the non-multicast segment 140 includes components that are capable of supporting BUM traffic, but such capability is disabled by users due to complexity in manageability and/or scalability or otherwise becomes temporarily unavailable. In some embodiments, the network elements 111-114, 121-124, 131-134 actively prevent multicast packets from being forwarded outside (e.g., by setting TTL field in the IP header to 1 to force the packet drop at routers), and therefore the non-multicast segment 140 includes the parts of the network 100 that never receive and therefor do not forward any multicast packets. In some embodiments, the non-multicast segment 140 allows only unicast network traffic.

In some embodiments, each multicast segment is defined by the available multicast capability of the underlying physical network infrastructure rather than by any predetermined topology. In some embodiments, a BUM segment is dynamically redefined by the extent that multicast capability is enabled at any given time. There is therefore no statically predetermined identifier associated with each multicast segment. For example, some embodiments include multicast capable L3 routers in the network. When enabled, these multicast capable L3 routers bring multiple IP subnets together to form a single multicast segment, so that no IP subnet address can adequately represent the entire multicast segment. Conversely, some embodiments include L2 switches that can disable its multicast support and cause some nodes in the network to be unable to send or receive multicast traffic. An L3 subnet having at least some nodes unable to send or receive multicast traffic cannot use its subnet address to represent a multicast segment, even if that L3 subnet is the only L3 subnet in the BUM segment. Likewise, a single BUM segment simultaneously including multiple L3 subnets cannot use any of the included L3 subnets to define the BUM segment.

In order to properly identify a multicast segment, some embodiments detect the underlying multicast capability and assign a unique segment identifier to each detected BUM segment. In the example illustrated FIG. 1, the multicast segment 110 has been assigned a segment identifier "A", the BUM segment 120 has been assigned a segment identifier "B", and the BUM segment 130 has been assigned a segment identifier "C". One of ordinary skill would recognize these identifiers as examples only, and that different embodiments use different naming conventions for multicast segment identifiers. For example, some embodiments use the subnet address of a highest ranking network element in the segment as the segment identifier.

A BUM segment is therefore a network segment defined by BUM traffic connectivity available in the network, and can be referred to as a connectivity segment. In some embodiments, such connectivity is provided by L2 link layer protocols that allow broadcast or multicast traffic. In some embodiments, the network includes L3 routers that allow BUM traffic between different IP subnets, and hence forming one or more connectivity segments that each includes multiple IP subnets.

Figure 2:
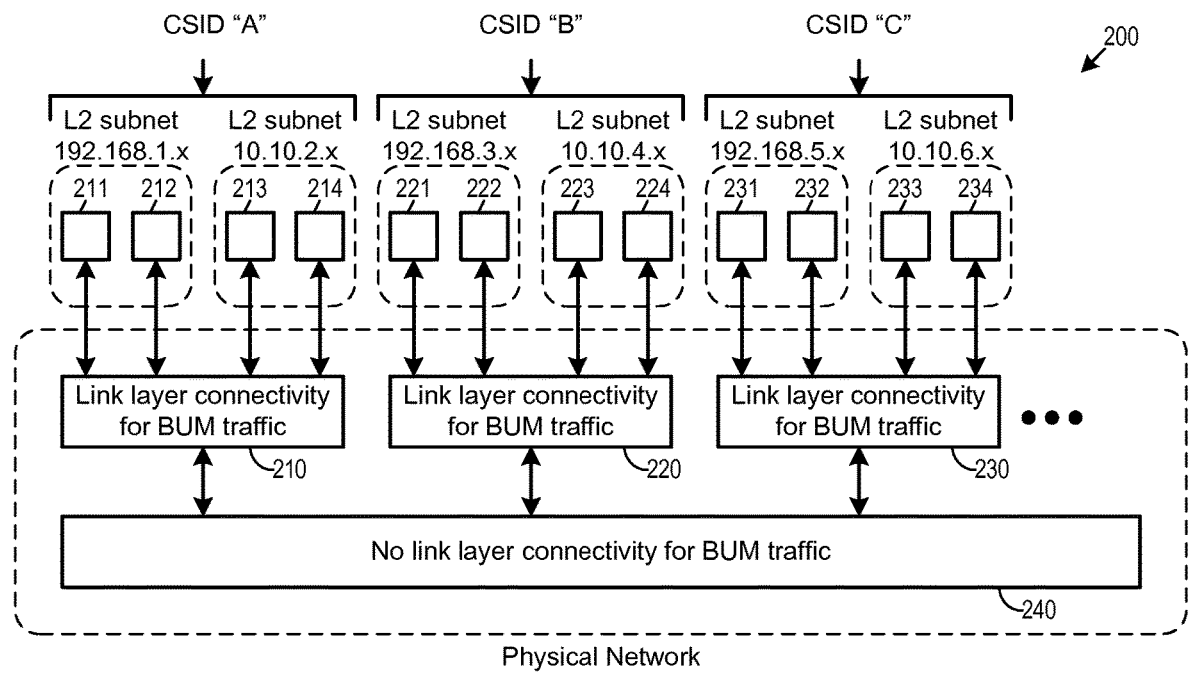
FIG. 2 illustrates a network that includes several connectivity segments.

FIG. 2 illustrates a network 200 that includes several connectivity segments 210, 220, and 230 that each includes host machines running virtualization software as network elements. Each of the connectivity segments is defined by broadcast or multicast connectivity provided by link layer protocols. The connectivity segment 210 includes host machines 211-214, the connectivity segment 220 includes host machines 221-224, and the connectivity segment 230 includes host machines 231-234. The host machines in the different connectivity segments are interconnected by parts of the network 200 that do not support link layer connectivity for BUM traffic (segment 240). The connectivity segment 210 is assigned connectivity segment ID (CSID) "A", the connectivity segment 220 is assigned connectivity segment ID "B", while the connectivity segment 230 is assigned connectivity segment ID "C". Host machines belonging to a same connectivity segment (i.e., having the same CSID) have BUM connectivity with each other, but not with any host machines outside of the connectivity segment. For example, host machines 221-224 have BUM connectivity with each other, but they do not have BUM connectivity with any of the host machines 211-214 or 231-234.

As illustrated in FIG. 2, at least some of the connectivity segments include multiple subnets. Specifically, the connectivity segment 210 encompasses subnets 192.168.1.x and 10.10.2.x, the connectivity segment 220 encompasses subnets 192.168.3.x and 10.10.4.x, and the connectivity segment 230 encompasses subnets 192.168.5.x and 10.10.6.x. Host machines in different subnets have BUM connectivity with each other as long as they are in the same BUM connectivity segment. For example, the host machines 211-212 are in L3 subnet 192.168.1.x and the host machines 213-214 are in L3 subnet 10.10.2.x, but the host machines 211-214 nevertheless have BUM connectivity with each other as they are all in the connectivity segment 210. In some embodiments, the different L3 subnets within a same connectivity segment are interlinked by one or more L2 switches that support BUM traffic.

In some embodiments, a connectivity segment can be a VLAN (Virtual Local Area Network) or an IP subnet inside a VLAN. In some embodiments, a VLAN contains only one IP subnet. In some embodiments, multiple IP subnets are allocated in a VLAN. In some embodiments, a connectivity segment is a multicast island that is a VLAN, and hence multicast forwarding is limited to be inside a VLAN. In some embodiments, a multicast island includes a set of VLANs and/or subnets that have high bandwidth and/or low cost links between each other. Such a multicast island in some embodiments includes L3 routers (or L3 switches) that support multicast routing, so multicast traffic can be routed among the internal VLANs, but cannot be routed out of the island or into the island from the outside.

Several more detailed embodiments of the invention are described below. Section I describes the identification of connectivity segments. Section II describes using connectivity segment identifiers for selecting proxy machines in remote segments. Section III describes an example host machine that implements some embodiments of the invention in a virtualization environment. Finally, section IV describes an electronic system with which some embodiments of the invention are implemented.

I. Identifying Connectiviy Segments a. Initial Coloring of Connectivity Segments A connectivity segment is a segment or section of the network that is defined based on a particular type of connectivity that is available in the underlying physical network. FIGS. 1-2 illustrate connectivity segments that are defined based on connectivity that supports broadcast, multicast, or unknown traffic (BUM traffic) of the physical network, In some embodiments, a connectivity segment can be defined under any network protocol that support traffic to unspecified recipients.

In order to identify a connectivity segment defined by a particular type of connectivity (e.g., multicast or broadcast) provided by a particular network protocol (e.g., Ethernet), some embodiments utilize the connectivity provided by the particular protocol to detect which network elements can be reached by the particular type of connectivity. Network elements reachable by the connectivity is recognized as being in a common connectivity segment and assigned a connectivity segment identifier (CSID). All network elements having a same CSID must have connectivity with each other under the particular protocol (e.g., broadcast, multicast connectivity under Ethernet protocol), while any two network elements having differing CSIDs must not have the connectivity under the particular protocol.

In some embodiments, the network system identifies the network elements belonging to a connectivity segment by using a segment coloring process. The segment coloring process identifies a connectivity segment of a particular type of connectivity by letting an identifier propagate to all network elements that are reachable by the particular type of connectivity. The identifier is analogous to a coloring agent that colors all entities that it is able reach.

Figure 3:
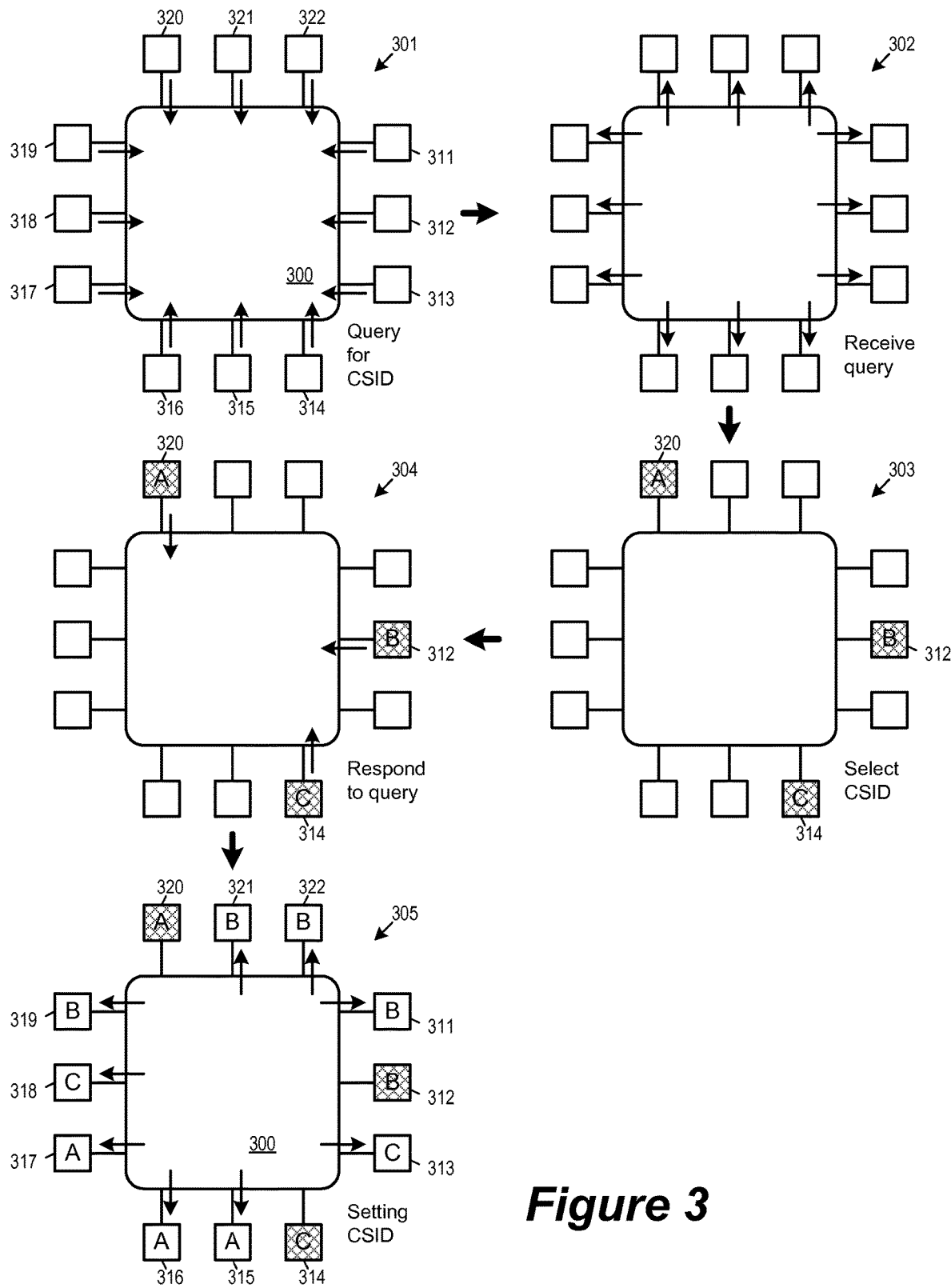
FIG. 3 illustrates the detection and identification of connectivity segments in a network by segment coloring.

For some embodiments, FIG. 3 illustrates the detection and identification of connectivity segments in a network 300 by segment coloring. The network 300 includes network elements 311-322. The segment coloring process will identify one or more connectivity segments based on a protocol that allows traffic to unspecified recipients. FIG. 3 illustrates the detection and identification process in five stages 301-305.

The first stage 301 shows the initial condition of the physical network prior to identification of connectivity segments. At this stage, it is unknown as to which network element belongs to which connectivity segment, or if there is any connectivity segment at all in the network 300. The stage 301 also illustrates the start of the segment coloring process, in which each network element sends out query for an identifier (e.g., CSID) for the connectivity segment that it belongs to. The second stage 302 in turn shows the queries arriving at the network elements of the network 300. In some embodiments, these queries are sent and received as data packets along the connectivity allowed by the particular protocol. In other words, these queries only reach network elements that are reachable according to the available connectivity in the network 300.

The third stage 303 shows the assignment or election of a particular network element for each segment. The elected network element will serve as the assignor for generating an identifier for the connectivity segment. The stage 303 shows that the network element 320 has been chosen as the assignor for the connectivity segment "A", the network element 312 has been chosen as the assignor for connectivity segment "B", and the network element 314 has been chosen as the assignor for connectivity segment "C". Each assignor in turn selects a CSID for its corresponding connectivity segment. The election of the assignor network element will be described further by reference to FIG. 4 below.

The fourth stage 304 shows the assignor sending response messages to the queries for CSIDs. Each response message carries the selected CSID. Like the query messages, the response messages are also sent along the connectivity allowed by the particular protocol, and thus each response message only reaches network elements that are in its connectivity segment. In some embodiments, each response message is sent to a network element that has queried for the CSID. In some embodiments, the response messages are broadcasted so each response message reaches all network elements permitted by the connectivity, whether it has already sent out a query for CSID or not.

The fifth stage 305 shows the response messages arriving at their destinations. Each receiving network element in turn sets its own CSID according to the CSID in the received response message. Since the response messages traverse the network 300 within the allowed connectivity, the received CSID would be that of the connectivity segment that the receiving network element belongs to. The fifth stage 305 also shows the result of the segment coloring process, by which each connectivity segment has been identified and assigned a CSID, and each network elements have set its CSID to that of its connectivity segment. In this particular example, the segment coloring operation has identified three connectivity segments "A", "B", and "C". The network elements 315, 316, 317, and 320 have set their CSID to "A" to indicate that they belong to connectivity segment A. The network elements 311, 312, 319, 321, and 322 have set their CSID to "B" to indicate that they belong to connectivity segment B. The network elements 313, 314, and 318 have set their CSID to "C" to indicate that they belong to connectivity segment C.

FIG. 3 illustrates multiple queries or multiple responses for the CSIDs at the stages 301, 302, and 305. However, in some embodiments, the segment coloring process is based on programs or instructions running locally on each network element. In some embodiments, these locally executing programs do not synchronize their queries or responses, and the queries and the responses are not necessarily generated at the same time. Furthermore, in some embodiments, the path taken by different query or response messages are not necessarily of the same duration or length, and some messages may traverse more routing or switching elements than others. The queries and the responses therefore do not necessarily arrive at the destination at the same time in some of these embodiments.

In some embodiments, the segment coloring operation illustrated in FIG. 3 elects a particular network element as the assignor that sets the identifier for a connectivity segment. In some embodiments, this election process is performed by the network elements in communication with each other by using the particular type of connectivity over the physical network. Each network element collects information about other network elements from these communications and the collected information are in turn used by each network element to determine if it should make itself the assignor for determining the identifier of its connectivity segment. In some embodiments, these communications are in the forms of query and/or response messages for CSIDs.

Figure 4:
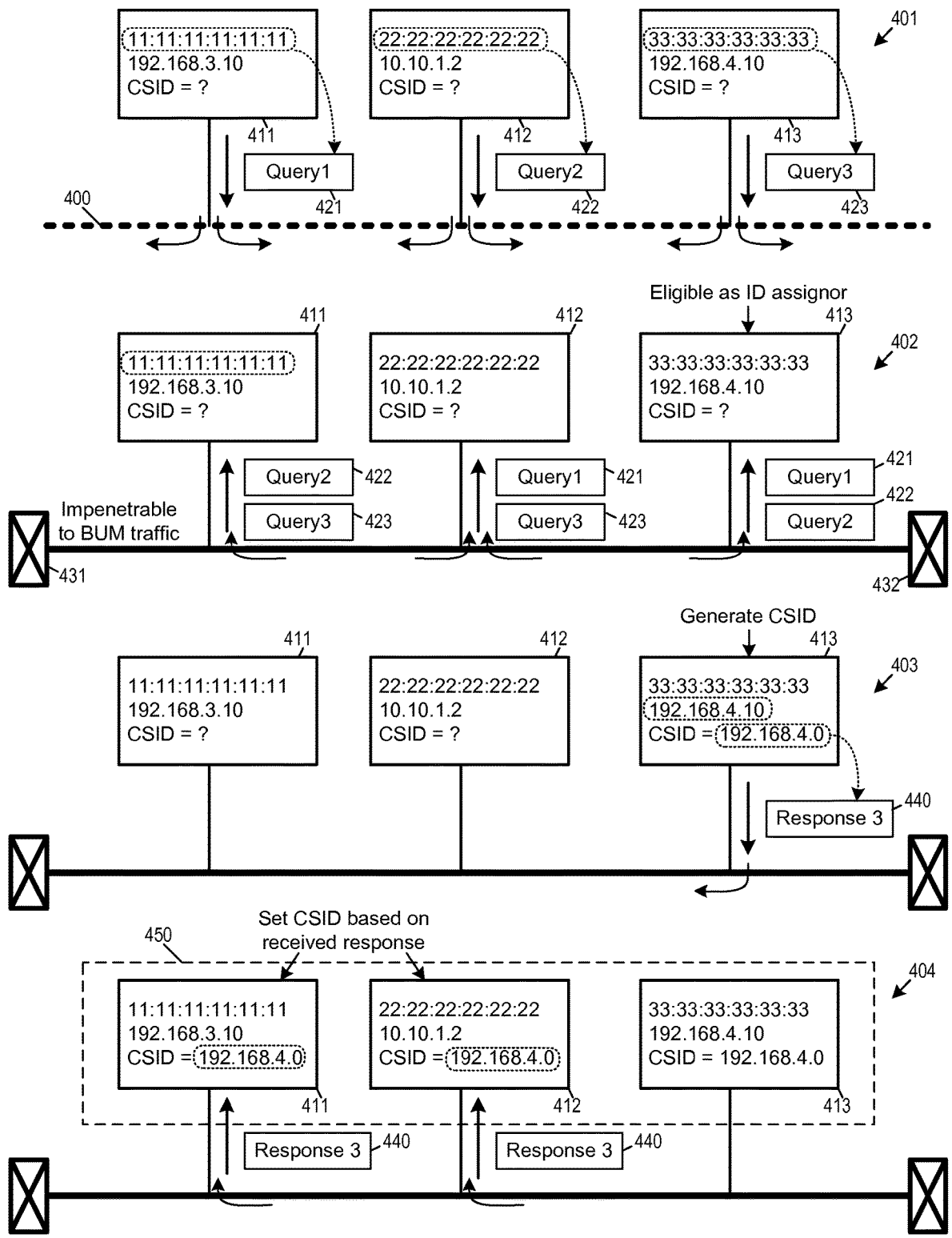
FIG. 4 illustrates the election of a particular network element as the assignor and the setting of the connectivity segment identifier during segment coloring process.

FIG. 4 illustrates a segment coloring protocol, which provides the election of a particular network element as the assignor and the setting of the connectivity segment identifier during segment coloring process. The election of the assignor is conducted among the network elements in the connectivity segment. FIG. 4 illustrates a network 400 that includes network element 411-413. The network element 411 has MAC address 11:11:11:11:11:11 and has IP address 192.168.3.10. The network element 412 has MAC address 22:22:22:22:22:22 and has IP address 10.10.1.2. The network element 413 has MAC address 33:33:33:33:33:33 and has IP address 192.168.4.10. Though not illustrated, the network 400 also includes other network elements in addition to the network elements 411-413. FIG. 4 illustrates the election of assignor for setting CSID in four stages 401-404.

The first stage 401 shows network prior to the segment color process. None of the network elements 411-413 has set its CSID, and the network has yet to identify any connectivity segment. In order to identify connectivity segments in the network 400, the network elements 411-413 initiate a segment coloring process that causes each of network elements to send a query for CSID into the network 400. The query messages 421-423 are from the network elements 411-413 respectively. In some embodiments, the query messages from the different network elements are not necessarily sent at the same time. Each of these query messages 421-423 has unspecified recipient so it can reach multiple recipients as allowed by the inherent connectivity. Each of these query messages also carries a device identifier that uniquely identifies the sender network element (e.g., its MAC and/or IP address).

The second stage 402 shows the query messages 421-423 arriving at their destinations. Specifically, the query message 421 follows the available connectivity to arrive at the network element 412 and 413, the query message 422 follows the available connectivity to arrive at the network element 411 and 413, and the query message 423 follows the available connectivity to arrive at the network element 411 and 412. The second stage also conceptually illustrates barriers 431 and 432 that are impenetrable to the query messages. In some embodiments, these barriers to the connectivity represent switches, routers, or other network elements that do not support BUM traffic or the particular type of connectivity relied upon by the query and/or the response messages.

Since each query message embeds the unique device identifier of its sender, a network element that receives the query messages is able to compare its own device identifier with those embedded in the query messages. By comparing its own device identifier with those embedded in the query messages, the receiving network element is able to determine if it could appoint itself as the assignor for setting the CSID. In the example of FIG. 4, each query message embeds the MAC address of its sender, so each recipient is able to determine if it can be the assignor by comparing its MAC address with those embedded in the query messages. The MAC address of the network element 411 is 11:11:11:11:11:11, while the MAC addresses embedded in the query message 422 and 423 are 22:22:22:22:22:22 and 33:33:33:33:33:33, respectively. The network element 413 therefore knows its MAC address is "higher" than other network elements in its connectivity segment and thus mark itself as being eligible for becoming the assignor. The network elements 411 and 412 on the other hand know that they cannot be the assignor, because their MAC addresses (11:11:11:11:11:11 and 22:22:22:22:22:22) are "lower" than the MAC address embedded in query messages that they receive (e.g., the query message 423 embedding MAC address 33:33:33:33:33:33 belonging to the network element 413). In other words, the network elements 411 and 412 know they cannot be the assignor because there is at least one network element in the connectivity segment having a MAC address that is higher than their own.

Different embodiments use different criteria for comparing the MAC addresses (or other type of unique device identifiers) of the network elements in the connectivity segment. What is "higher" may be defined as being numerically closest to zero, defined as being numerically farthest from zero, or defined according to any other ranking criteria that is capable of providing a basis for comparison between the different MAC addresses.

The third stage 403 shows the generation of the CSID by the assignor network element 413. In some embodiments, a network element eligible to become the assignor would first make sure there is no other network element with higher MAC address on its connectivity segment before making itself the assignor (e.g., by waiting for query messages from higher MAC addresses for a period of time.) At the stage 403, the network element 413 has determined that its connectivity segment 400 does not have a network element with a higher MAC address than "33:33:33:33:33:33", and therefore it is the assignor for generating the CSID of its connectivity segment.

In some embodiments, the assignor generates a CSID based on its own IP subnet. Such a CSID is able to uniquely identify a connectivity segment when it is known that BUM traffic can be forwarded within the connectivity segment containing the IP subnet. In some embodiments, the assignor may use other means of generating a unique CSID, such as contacting a central CSID generator to determine the next available unique CSID. In the example of FIG. 4, the assignor network element 413 generates a CSID 192.168.4.0 based on its own IP subnet (i.e., 192.168.4.x). Once the CSID has been generated, the assignor network element 413 sends a response message 440 into the network 400 (as response to the CSID queries 421-422). The response message 440 embeds the newly generated CSID "192.168.4.0". In some embodiments, the response message 440 is also a packet with unspecified recipient so it will reach multiple recipients as allowed by the inherent connectivity.

The fourth stage shows the setting of the CSID by network elements that receive the response message 440. Namely, the network elements 411 and 412 set their CSID to 192.168.4.0 in accordance with the response message 440. Since a response message is a message that reaches all recipients as allowed by the inherent connectivity, the reach of the response message hence defines a connectivity segment. In other words, since the response message 440 reaches the network elements 411 and 412 from the network element 413, the setting of the CSID by the response message 440 defines a connectivity segment 450 that encompasses the network elements 411 (the assignor), 412, and 413.

Figure 5A:
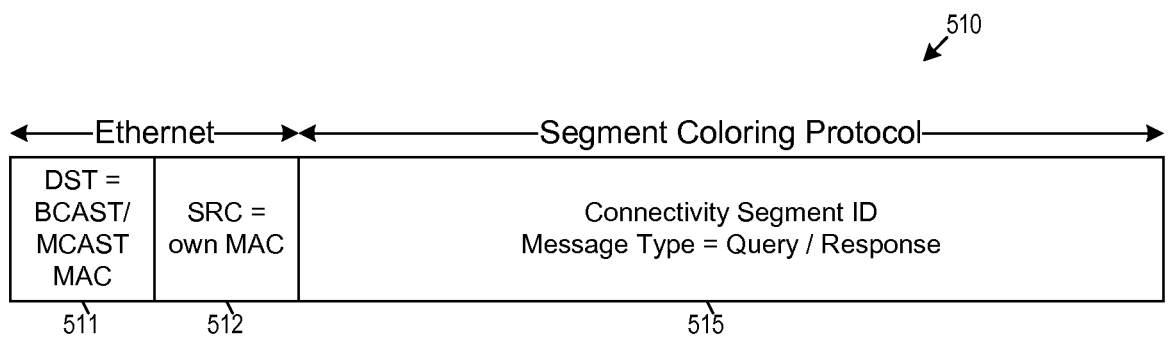
FIGS. 5a-b illustrate the content/format of example segment coloring query/response messages.
Figure 5B:
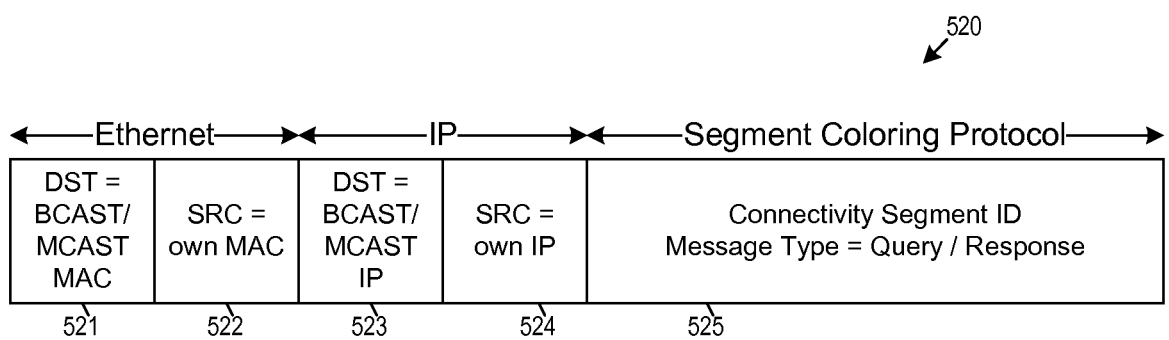

As mentioned, a connectivity segment is defined by the reach of connectivity, which in some embodiments is detected by the reach of the query and/or the response messages during the segment coloring process as described above by reference to FIGS. 3 and 4. In some embodiments, the reach of a segment coloring query/response message is determined by its content or format. FIGS. 5*a-b* illustrate the content/format of example segment coloring query/response messages.

FIG. 5*a* illustrates an example packet 510 for performing segment coloring. Specifically, the packet 510 is a L2 level or link layer Ethernet packet that specifies either broadcast or multicast. The Ethernet segment coloring packet 510 includes a destination address field 511, a source address field 512, and segment coloring protocol data 515. For a connectivity segment defined by broadcast traffic, the destination field 511 specifies the broadcast MAC address (e.g., FF:FF:FF:FF:FF:FF), which allows the packet to be forwarded to and accepted by all nodes in the IP subnet. For a connectivity segment defined by a particular multicast group, the destination field specifies a multicast MAC address that is recognized by all nodes in the IP subnet that belongs to the particular multicast group.

The source field 512 specifies the MAC address of the sender network element. In some embodiments, this source MAC address allows the recipients of the packet 510 to determine if it is eligible to be the assignor for setting CSID by comparing its own MAC address against the MAC address of the network element sending the query message. The segment coloring protocol data 515 is the payload of the packet 510. It specifies whether this packet is a query message for CSID or a response message carrying the CSID. If the packet 510 is a response message from an assignor network element, the segment coloring protocol data 515 would include the CSID generated by the assignor network element. For example, the query message 422 can be a packet with a payload that specifies itself to be a segment coloring querying message, while the response message 440 can be a packet with a payload that specifies itself to be a segment coloring response message and "198.163.3.0" as the CSID.

FIG. 5*b* illustrates another example packet 520 for performing segment coloring. Like the packet 510, the packet 520 is also a broadcast or multicast packet. However, unlike the packet 510, the packet 520 is a L3 level or IP layer packet that can travel from one IP subnet to another IP subnet through L3 routers that support BUM traffic.

The L3 level segment coloring packet 520 includes a L2 destination field 521, a L2 source field 522, a L3 destination field 523, a L3 source field 524, and a payload field 525 for segment coloring protocol. The payload field 525 is the same as the payload field 515, which specifies this packet to be a segment coloring query message or a segment coloring response message that includes the CSID. The L2 destination field 521 and the L2 source field 522 are the same as the destination field 511 and the source field 512 of the L2 segment coloring packet 510. However, in addition to specifying broadcast or multicast MAC address in the L2 destination field 521, the L3 destination field 523 also specifies a broadcast IP address (e.g., 255.255.255.255) or a multicast IP address, which can be used by an L3 router to perform broadcast or multicast forwarding across subnet boundaries (if the L3 router supports BUM traffic).

Figure 6:
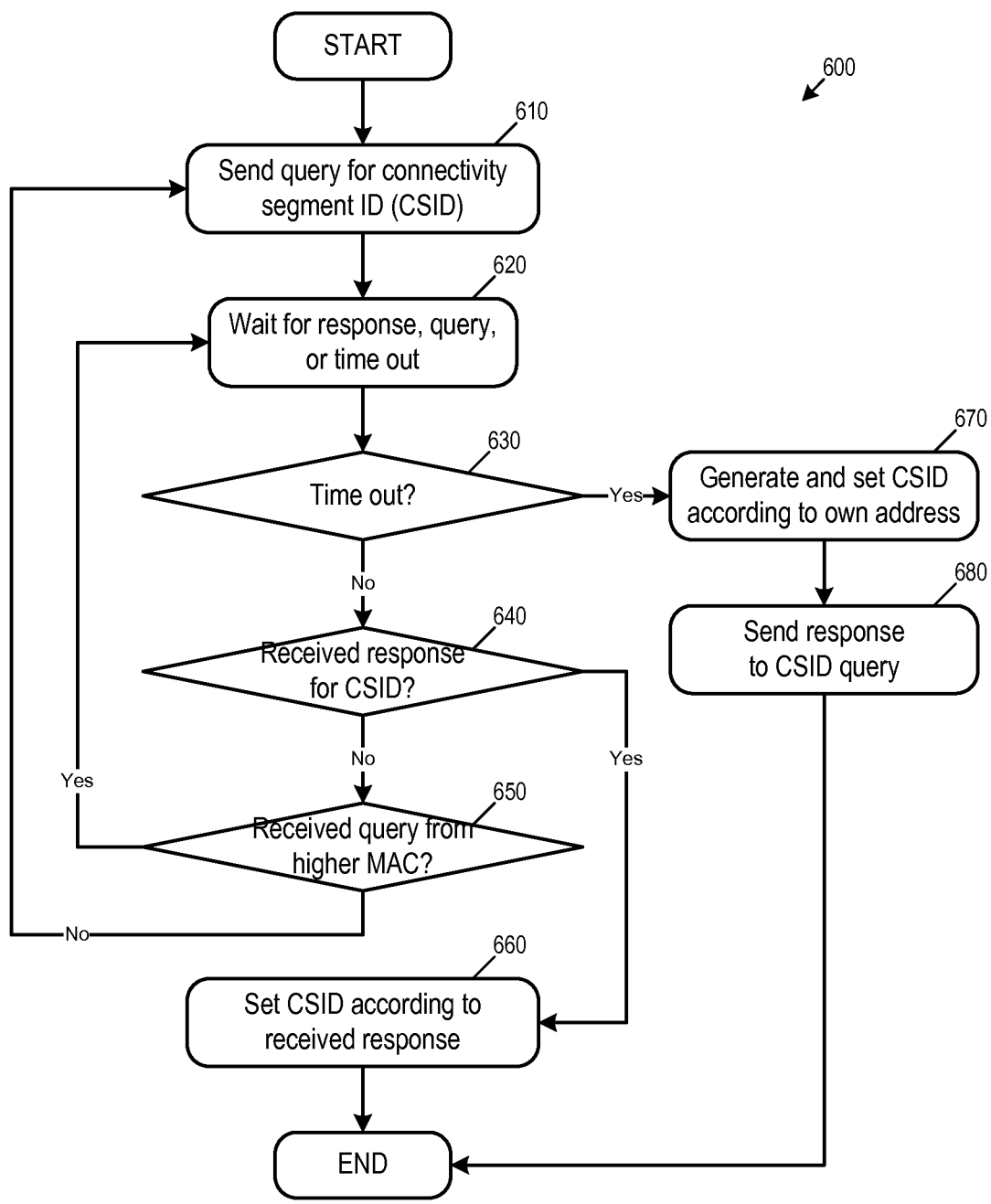
FIG. 6 conceptually illustrates a segment coloring process that is executed by individual network elements.

In some embodiments, the segment coloring process is a distributive process that takes place in each of the participating network elements. FIG. 6 conceptually illustrates a segment coloring process 600 that is executed by individual network elements. In some embodiments, at least some of the network elements 311-322 and 411-413 execute the segment coloring process 600.

The process 600 starts when the network element receives a command to start the segment coloring process. In some embodiments, such a command comes from a central network controller or manager. In some embodiments, the network element generates such a command internally when, for example, the network element first joins the network (e.g., upon power up).

Once started, the process sends (at 610) a query for a connectivity segment ID (CSID). In some embodiments, the query message is a message without a specified recipient (i.e., broadcast or multicast). Such a message will reach all network nodes allowed by the available BUM connectivity in some embodiments. Next, the process waits (at 620) for a response message to the CSID query, a query message from another network element, or a timeout condition. When at least one of these conditions has occurred, the process proceeds to 630.

At 630, the process determines if a time out condition has occurred. In some embodiments, the time out condition occurs if the process waited for a certain period of time without receiving any response message with CSID or any query message with higher MAC address. In some embodiments, the process 600 times out even if it has received a query from a higher MAC before as long as it has not received a query from a higher MAC or a response for a certain period of time. This ensures the robustness of the process and avoids deadlock if the higher MAC response never arrives. If a time out condition has occurred, the process proceeds to 670. Otherwise, the process returns to 640.

At 640, the process determines if it has received a response to the CSID query. The response message would carry the CSID generated by the assignor of the connectivity segment. In some embodiments, such a response is also a message without a specified recipient so it reaches all network node allowed by the available BUM connectivity. If the process has not received a response, it proceeds to 650. If the process has received a response, it proceeds to 660 to adopt the CSID embedded in the received response message as its own. By doing so, the process "colors" itself with the CSID of the response message and allows itself to be detected as being part of the connectivity segment represented or identified by the CSID.

At 650, the process determines if it has received a query from a network element with a higher unique device identifier (e.g., MAC address) than its own. In other words, the process at 650 determines if it is still eligible to be the assignor of the connectivity segment. A network element is eligible to become the assignor of the connectivity segment if it has not received a response with CSID or if it has not received a query message from a network element that is "more eligible" than itself (i.e., a network element with a higher MAC address.) If the current network element is no longer eligible to serve as the assignor (e.g., having received a higher MAC query), it proceeds back to 620 to continue to wait for a response, query, or timeout, but would not send out any more queries. If the current network element is still eligible to serve as the assignor, the process proceeds to 610 to continue to query for CSID.

At 670, the process 600 declares itself the assignor of the connectivity segment because it has waited long enough. The process therefore generate a identifier for the connectivity segment (CSID) and "color" itself as being in the connectivity segment by adopting this generated CSID.

Next, the process sends (at 680) a response message and embeds the newly generated CSID in the response message. In some embodiments, the response message is a message without a specified recipient (i.e., broadcast or multicast) so it will reach all network nodes allowed by the available BUM connectivity in some embodiments. The recipients of this response message will adopt the CSID and "color" themselves as being part of the same connectivity segment as this network element. After sending the response message, the process 600 ends.

b. Dynamic Detection of Connectivity Segments

Figure 7:
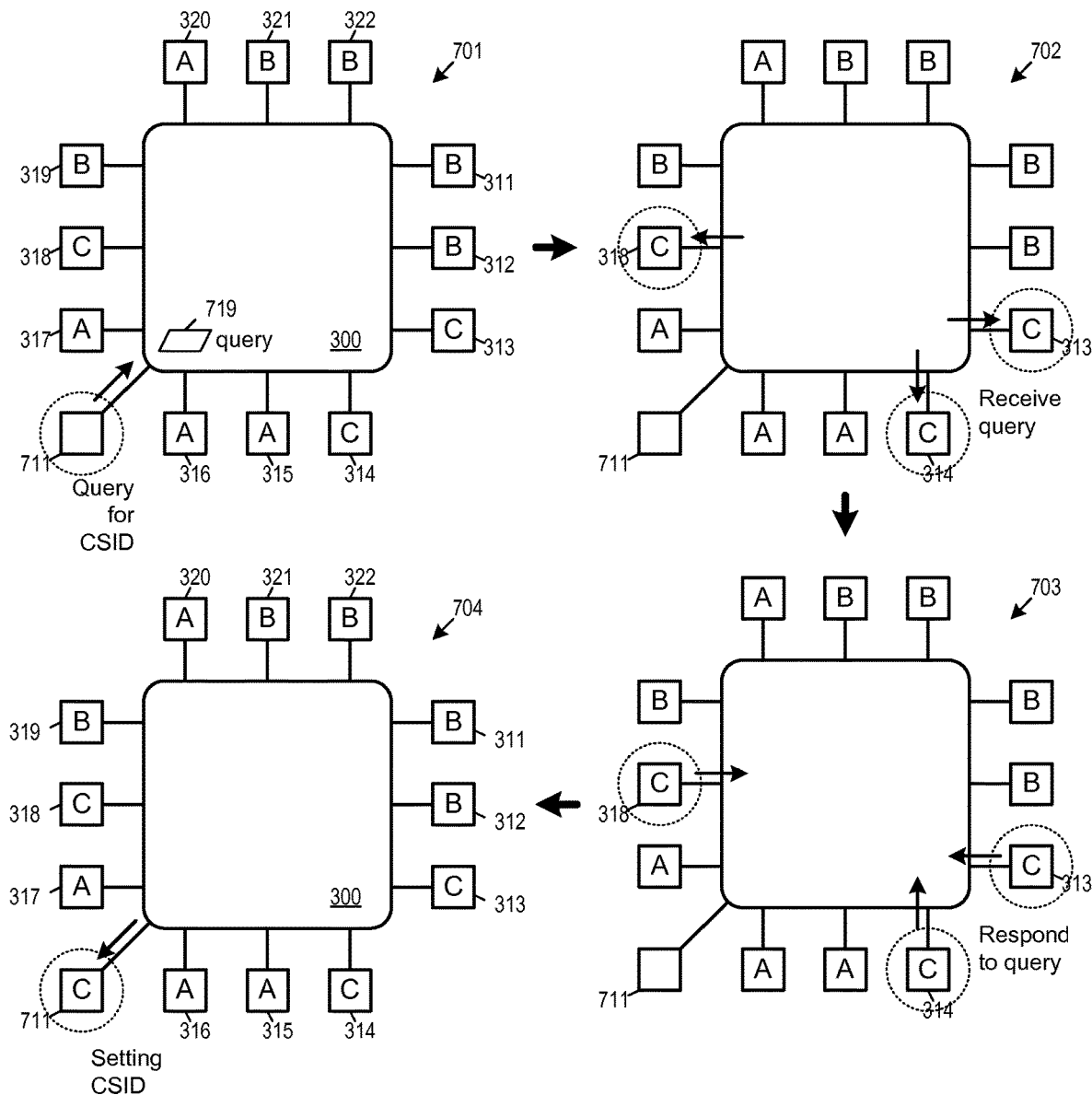
FIG. 7 illustrates the redefinition of a connectivity segment due to the detection of a new network elements being added to the connectivity segment.

As mentioned, the identification of connectivity segment is a dynamic process that detects the available connectivity in the network. Some embodiments therefore continuously detect any changes to the connectivity segments and update the definition of each connectivity segments accordingly. FIG. 7 illustrates the redefinition of a connectivity segment due to the detection of a new network elements being added to the connectivity segment.

FIG. 7 illustrates the network 300 of FIG. 3, where network elements 315, 316, 317, and 320 have been identified as belonging to the connectivity segment A, the network elements 311, 312, 319, 321, and 322 have been identified as belonging to the connectivity segment B, and the network elements 313, 314, and 318 have been identified as belonging to the connectivity segment C. A network element 711 is connected to the network 300, though it is unknown if it belongs to any of the connectivity segments.

FIG. 7 shows the update to the connectivity segments in four stages 701-704. The first stage 701 shows the network element 711 sending out a query message 719 for CSID into the network 300. The query message 719 follows the connectivity of the connectivity segment C to reach network elements 313, 314, and 318 at the second stage 702. The network elements 313, 314, and 318 have already adopted CSID to mark them as being in the connectivity segment C.

The third stage 703 shows the network elements 313, 314, and 318 responding to the query message 719. In some embodiments, any network element that already has adopted a CSID can respond to segment coloring query messages with its own CSID without being the assignor. In some embodiments, the response message will be broadcast to the entire connectivity segment, and a network element that receives a response from another network element would refrain from sending duplicate responses. At least one of the response messages follows the connectivity of segment C and reaches the network element 711 at the fourth stage 704. The network element 711 in turn adopt the CSID in the response message and identifies itself as also being in the connectivity segment C. The connectivity segment has therefore been redefined to include the network element 711 in addition to the network element 313, 314, and 318.

In some embodiments, a network element such as 711 can join a connectivity segment after others in the segments have already completed their segment coloring process and set their CSID. Such a condition may arise when the network element has just power up, when intermediate switching or routing elements has just enabled connectivity, or simply because the network element started performing segment coloring process after others have already completed theirs.

Figure 8A:
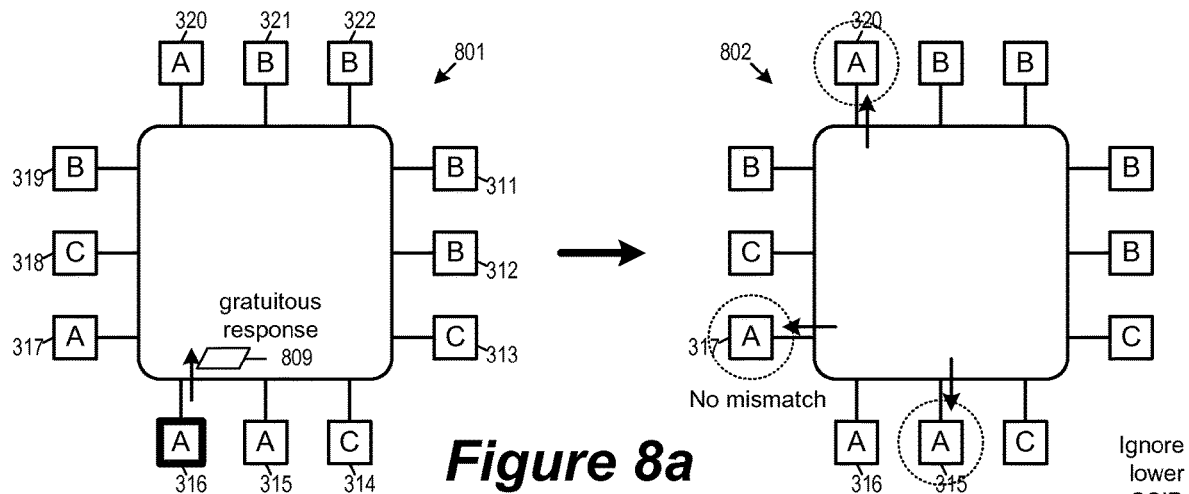
FIGS. 8a-c illustrate the detection of changes to connectivity segments by using gratuitous CSID response messages.
Figure 8B:
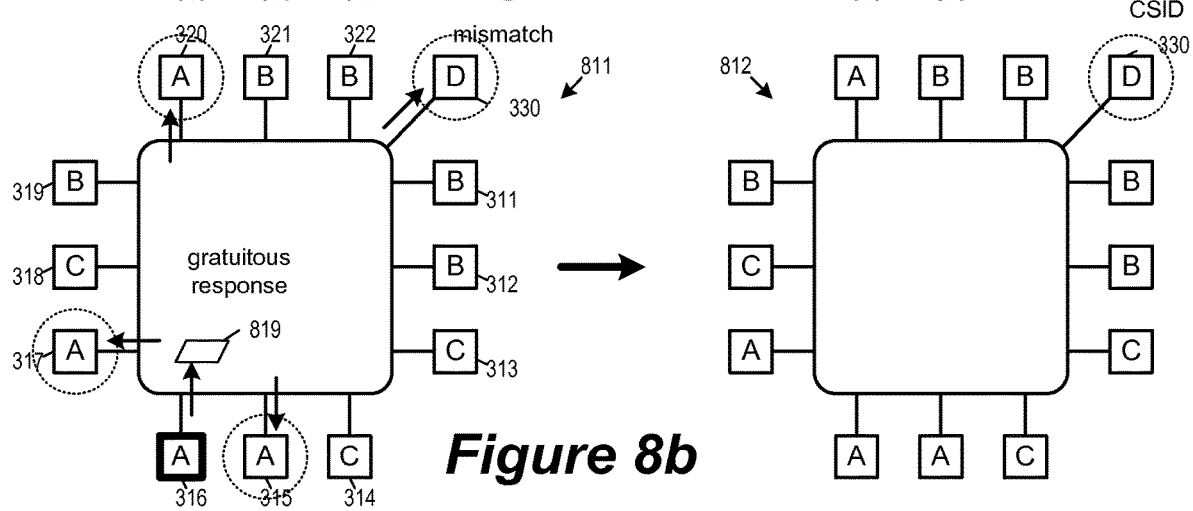
Figure 8C:
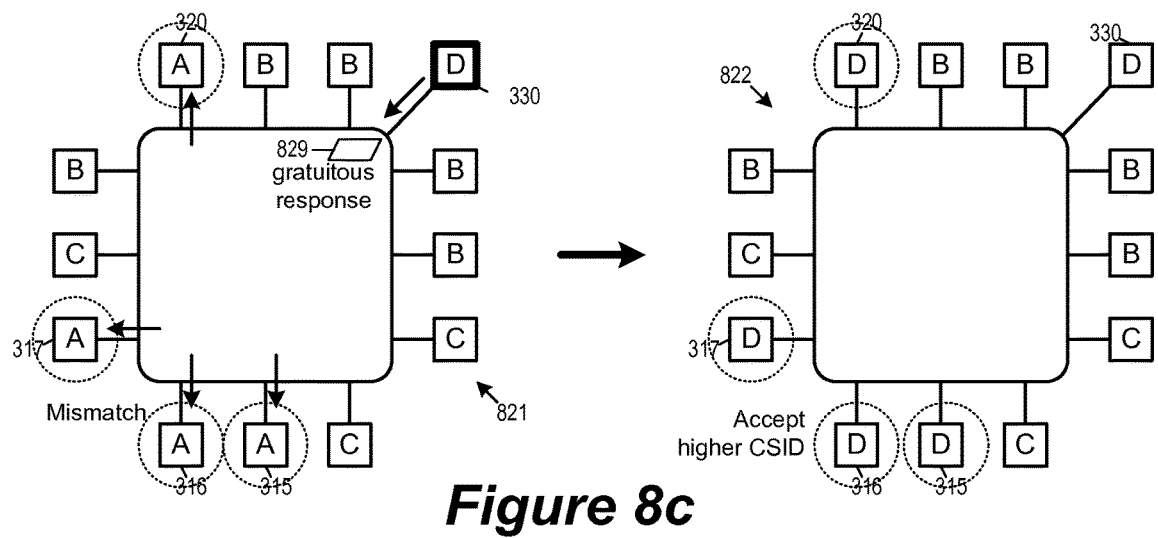

In some embodiments, after having adopted a CSID, each network element would periodically send out response messages with its own CSID gratuitously (i.e., without being queried). The gratuitously sent CSID response messages are then used to detect changes in the connectivity segments. FIGS. 8a-c illustrates the detection of changes to connectivity segments by using gratuitous CSID response messages.

FIGS. 8a-c illustrate the network 300 of FIG. 3, where network elements 315, 316, 317, and 320 have been identified as belonging to the connectivity segment A (having CSID "A"), the network elements 311, 312, 319, 321, and 322 have been identified as belonging to the connectivity segment B (having CSID "B"), and the network elements 313, 314, and 318 have been identified as belonging to the connectivity segment C (having CSID "C").

In two stages 801-802, FIG. 8a illustrates the use of gratuitous response to determine that there is no change to a connectivity segment. At the first stage 801, the network element 316 generates a response message 809 into the network 300. The response message 809 carries the CSID of the network element 316, identifying it as being in the connectivity segment A. The message 809 is gratuitous because the network element 316 produced the response message without receiving any message querying its CSID. At the second stage 802, the gratuitous response message 809 follows the connectivity of segment A and reaches the network elements 0315, 317, and 320. Since the CSID of the recipients matches the CSID in the response message, there need not be any changes. In other words, the gratuitous message did not detect any changes to the connectivity segment A.

In some embodiments, a gratuitous message makes it possible to detect changes in a connectivity segment by detecting mismatch between the CSID in the gratuitous response message and the CSID in the recipient network element. The connectivity segment is redefined to reflect changes in the connectivity in the network when at least some of the network elements change their own CSID based on the received gratuitous responses.

In some embodiments, whether a network element receiving a response message with a mismatching CSID would change its own CSID depends on whether the CSID in the response message is "higher" than its own. For some embodiments, the definition of "higher" can be arbitrarily chosen. What is "higher" may be defined as being numerically closest to zero, defined as being numerically farthest from zero, or defined according to any other ranking criteria that is capable of providing a basis for comparison between the different CSIDs.

FIG. 8b illustrates a gratuitous message carrying a mismatching CSID that is lower than the recipient network element in two stages 811-812. At the first stage 811, the network element 316 sends a gratuitous response message 819 into the network 300. However, unlike the gratuitous response message 809 in FIG. 8a, the gratuitous message 819, in addition to reaching the other network elements in the segment "A", also reaches a new network element 330 that is not in the network segment "A". This new network element 330 has a different CSID that indicates it is in segment "D". The network element 330 has previously performed segment coloring process and has already adopted the CSID "D" when it had no BUM connectivity with the network element 316. The network element 330 is now brought into connectivity with the network element 316 because of a reconfiguration in the network 300 that enables BUM traffic between the two network nodes.

At the second stage 812, the network element 330 compares the CSID in the gratuitous message with that of its own. In this example, the CSID "D" of the network element 330 is higher than the CSID "A" of the received gratuitous response message 819. As a result, the network element 330 would not change its CSID.

Conversely, in some embodiments, when a network element receives a CSID that is higher than its own from a gratuitous message, it would adopt that higher CSID as its own, thereby merging itself into the connectivity segment represented by the higher CSID. In two stages 821-822, FIG. 8c illustrates the changing of CSID when network elements receive response messages with CSID higher than their own.

At the first stage 821, the network element 330 sends out a gratuitous response message 829 into the network 300. The response message 829 follows the available connectivity to reach the network elements 315, 316, 317, and 320. The response message 829 carries the CSID "D" of the network element 330, which mismatches the CSID "A" of the network elements 315, 316, 317, and 320.

At the second stage, the network elements 315, 316, 317, and 320 adopt CSID in the response message 829 as their own CSID, because the CSID "D" in the response message is "higher" than their own CSID "A". Consequently, the connectivity segment "A" merges with the connectivity segment "D", which now includes network elements 330 as well as the network elements 315, 316, 317, and 320.

Figure 9:
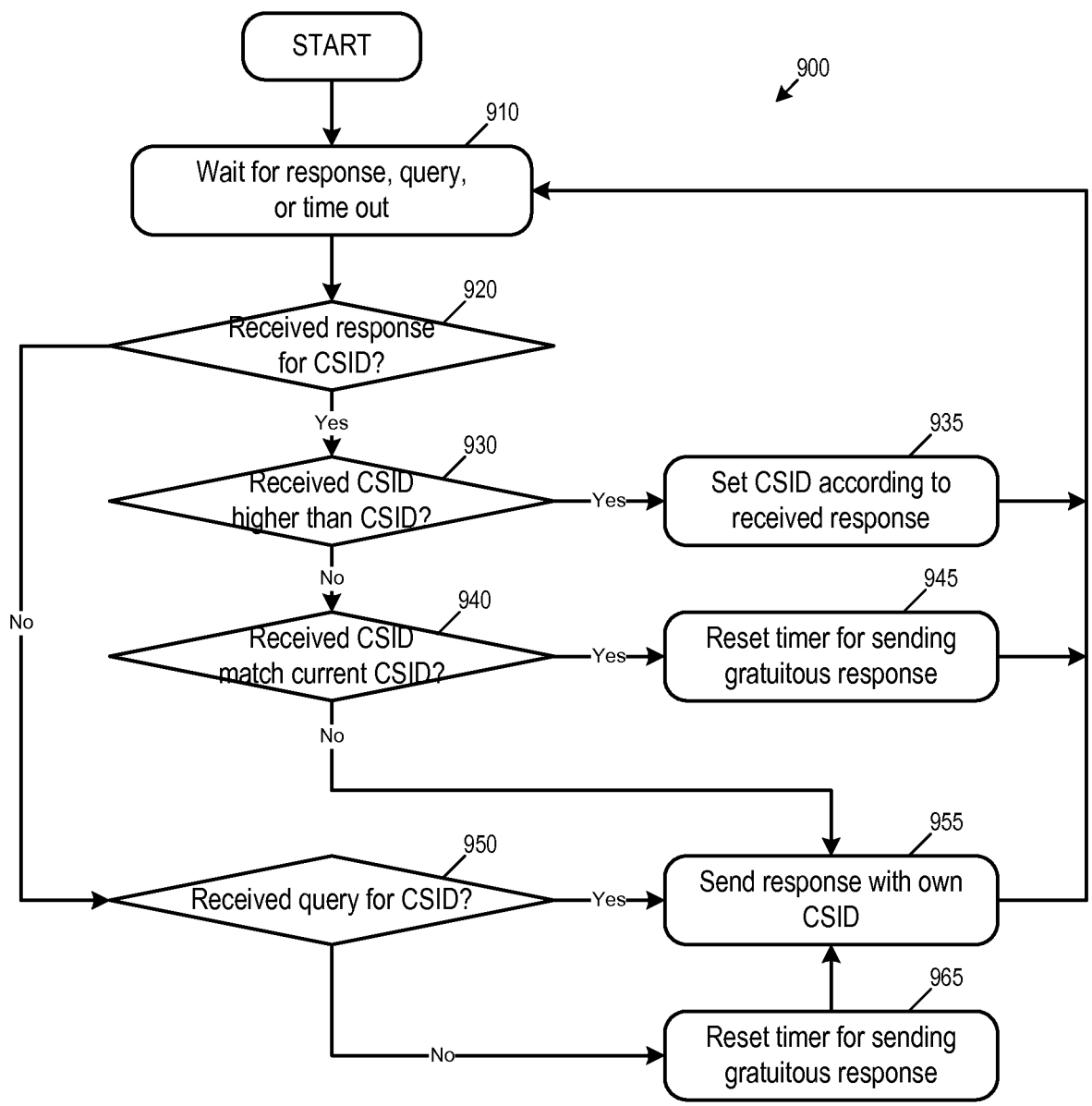
FIG. 9 conceptually illustrates a process for continuously detecting changes in the inherent network topology and underlying connectivity.

For some embodiments, FIG. 9 conceptually illustrates a process 900 for continuously detecting changes in the inherent network topology and underlying connectivity. Like the process 500, the process 900 is also performed by individual network elements. In some embodiments, a network element performs the process 500 to query for an initial CSID and then performs the process 900 to monitor for changes in the network and to update its CSID accordingly.

In some embodiments, the process 900 starts when the network element performing the process has adopted a CSID and thereby identified itself as belonging to the connectivity segment represented by the CSID. The process then waits (at 910) for a response message, a query message, or if a timer has expired. When at least one of these conditions has occurred, the process proceeds to 920.

At 920, the process determines whether it has received a response message carrying a CSID. This response message can be in response to an earlier query by another network node or a gratuitously generated response. If the process has received a response message with a CSID, it proceeds to 930. Otherwise, the process proceeds to 950.

At 930, the process determines if the CSID in the received response message is "higher" than the CSID of the network element. If the received CSID is not "higher" than the network element's own CSID, the process proceeds to 940. Otherwise, if the received CSID is "higher" than its own, than it proceeds to 935 and changes its CSID to be the same as that of the received response message. By doing so, the process ensures that all network elements having BUM connectivity with each other will converge on the same CSID, regardless of whether they were initially assigned a different CSID. After changing the CSID of the network element, the process returns to 910 to continue monitoring for new response or query messages.

At 940, the process determines whether the CSID in the received response message is the same or lower than the network element's own CSID. If the received CSID is "lower", the process proceeds to 955, sending out a response with its own "higher" CSID to update the node(s) currently assigned to the "lower" CSID. Otherwise, the process proceeds to 945 to reset a timer for sending gratuitous responses. As mentioned, each network element having a defined CSID would periodically send out gratuitous response messages based on a timer in order to detect change in the network that would affect the definition of the connectivity segment. However, there is no need to send a response message advertising one's own CSID if another network element having the same CSID has just send a response message with the same CSID. Some embodiments therefore reset the gratuitous message timer whenever the process receives a response message with the same CSID. After resetting the gratuitous message timer, the process returns to 910 to continue monitoring for new response or query messages.

At 950, the process determines whether it has received a query for CSID. As mentioned above in Section II.a, a network element having no CSID may query the network for a CSID in order to determine what connectivity segment, if any, it belongs to. Before connectivity segments have been identified, such queries lead to identification of connectivity segment and assignment of CSID. After connectivity segments have already been identified, such query allows a network element to join a previously identified connectivity segment. If the process has received a query for CSID, it proceeds to 955 to send a response with the network element's CSID before returning to 910 to continue monitoring for new response or query messages. Otherwise, the timer for gratuitous response has expired and the process proceeds to 965 to reset the timer, after which the process proceeds to 955 to gratuitously send the response message with the network element's own CSID. As mentioned, network elements already belonging to a connectivity segment nevertheless periodically sends out response messages gratuitously without being queried in order to continuously detect changes in the network. The period for sending out such gratuitous messages is regulated by a timer, which resets to an initial count when this network element sends a gratuitous response or when this network element receives a gratuitous response with a same CSID (as in operation 945).

Figure 10:
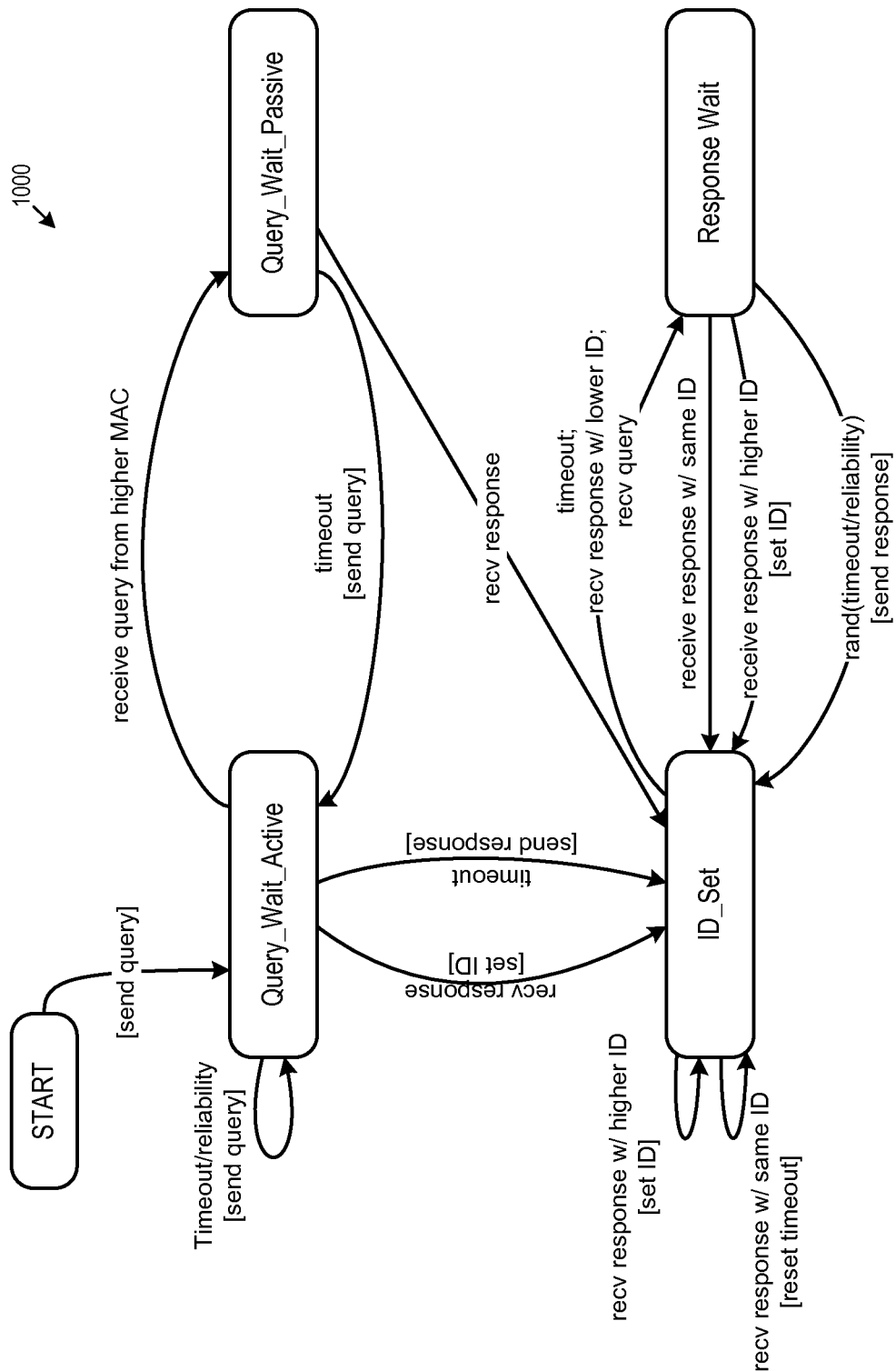
FIG. 10 conceptually illustrates a state machine for dynamic identification of connectivity segments.

In some embodiments, the process 600 and the process 900 are performed by the same state machine. FIG. 10 conceptually illustrates a state machine 1000 for dynamic identification of connectivity segments. The state machine 1000 includes four states: a "QUERY WAIT ACTIVE" state, a "QUERY WAIT PASSIVE" state, an "ID SET", and a "RESPONSE WAIT" state. The state machine also uses following constants: TIMEOUT, RELIABILITY, and REQUERY_DELTA. The following is the description of the states and the constants of the state machine 1000:

TIMEOUT constant: A common time period amongst nodes on a network, which defines the length of time a node remains in a given state before declaring a timeout and transitioning to a new state.

RELIABILITY constant: A common value among all nodes on a network, which defines the maximum number of dropped packets the protocol can tolerate.

REQUERY_DELTA constant: The duration between subsequent queries while a node is in the QUERY_WAIT_ACTIVE state. In some embodiments, this constant is defined as (TIMEOUT/RELIABILITY).

QUERY_WAIT_ACTIVE State:

In this state, a node has sent a query message and is awaiting a possible response from an existing node on the network which is aware of the CSID, or another node on the network in the QUERY_WAIT_ACTIVE state as well. When initiating the state machine, some embodiments broadcast a query then begin in this state. If a node receives a query-response while in this state, it stores the CSID from the response and transition to the ID_SET state. If a node receives a query while in this state, its action depends on the (protocol specific) source address of the query. The node with the highest address remains in the QUERY_WAIT_ACTIVE state, while the node with the lower address transitions to the QUERY_WAIT_PASSIVE state and continue awaiting a query-response. To achieve this, in some embodiments, a node that receives a query with a source address lower than its own broadcasts another query to inform the node with the lower address to transition to the QUERY_WAIT_PASSIVE state. After entering this state (QUERY_WAIT_ACTIVE), a node re-broadcasts a query every REQUERY_DELTA to ensure the protocol can tolerate periodic dropped packets. After a node has been this state for TIMEOUT, it becomes the connectivity segment's assignor. It generates the CSID and broadcasts a query-response with the generated CSID to inform any node(s) still in the QUERY_WAIT_PASSIVE state.

QUERY_WAIT_PASSIVE State:

In this state, a node has broadcast a query message, but received a subsequent query from a node with a higher address, so it is no longer the potential assignor for a connectivity segment. If a node receives a query-response while in this state, it stores the CSID from the response and transition to the CSID_SET state. After entering this state, a node in some embodiments wait for TIMEOUT before declaring the previously seen potential assignor dead, and returning to the QUERY_WAIT_ACTIVE state.

ID SET State:

In this state, a node has determined the CSID of its connectivity segment, either by declaring it itself or receiving a query-response. It now listens for queries for CSID. Upon receiving a query, the node transition to the RESPONSE_WAIT state. In order to detect and recover from an CSID mismatch, such as after an network partition is resolved, a node in some embodiments periodically enter the RESPONSE_WAIT state to send a gratuitous query-response if it does not see a response with its CSID for TIMEOUT. If the node receives a response with a mismatching CSID, the higher CSID is be used. If a query-response is received with a higher CSID than the node's own, then the node changes its CSID to that of the message and reset its gratuitous response timeout. If a query-response is received with a lower CSID, then the node transitions to the RESPONSE_WAIT state. If the received query-response has the same CSID as the node, the node in some embodiments resets the gratuitous response timeout as the connectivity segment's CSID has just been verified.

RESPONSE_WAIT State:

In this state, a node has determined the CSID of its network and subsequently received a query. To maximize robustness and minimize excess network traffic, the state machine in some embodiments does not have the notion of a "master" node, and instead allows any node which knows the CSID to respond to queries. To prevent a flood of responses, a node in some embodiments selects a random value between 0 and REQUERY_DELTA to wait in the RESPONSE_WAIT state. If a node receives a query-response while in this state with a matching CSID, it knows the querying node and/or mismatching has been acknowledged and returns to the ID_SET state without broadcasting a response. If a query-response with a higher CSID is received, then the node changes its CSID to that of the message and return to the ID_SET state. If a query-response has a lower CSID, the state machine ignores it, with the node continuing to wait for its random time interval to be complete. If an node does not receive a query-response within the random time interval selected, it broadcasts a query-response with the CSID. This simultaneously informs any nodes in the QUERY_WAIT_ACTIVE or QUERY_WAIT_PASSIVE states of the state machine, and informs any nodes in the RESPONSE_WAIT state that they can return to the ID_SET state quietly.

II. Using Identified Connectiviy Segments

The dynamic identification of connectivity segments as described above in Section I allows the network or the user of the network to identify connectivity segments or multicast islands that supports broadcast, multicast, or unknown recipient traffic (BUM). With the connectivity segments identified, the system can fully exploit the inherent BUM traffic capability in each of the connectivity segments when forwarding multicast or broadcast packets across the entire network.

In order to use the identification of connectivity segment for performing multicast, a given network element in some embodiments uses the connectivity segment IDs (CSIDs) to identify connectivity segments in the network. Network elements having the same CSID as the given network element are recognized as being in the local segment of the given network element, while network element having other CSIDs are recognized as being in remote segments. To forward multicast traffic to remote segments, the given network element selects a network element from each of the remote segments as multicast proxy and forwards a multicast packet to each of the selected proxies. Each selected proxy in turn uses the inherent support for BUM traffic of its corresponding remote segment to replicate the and forward the multicast packet.

Figure 11:
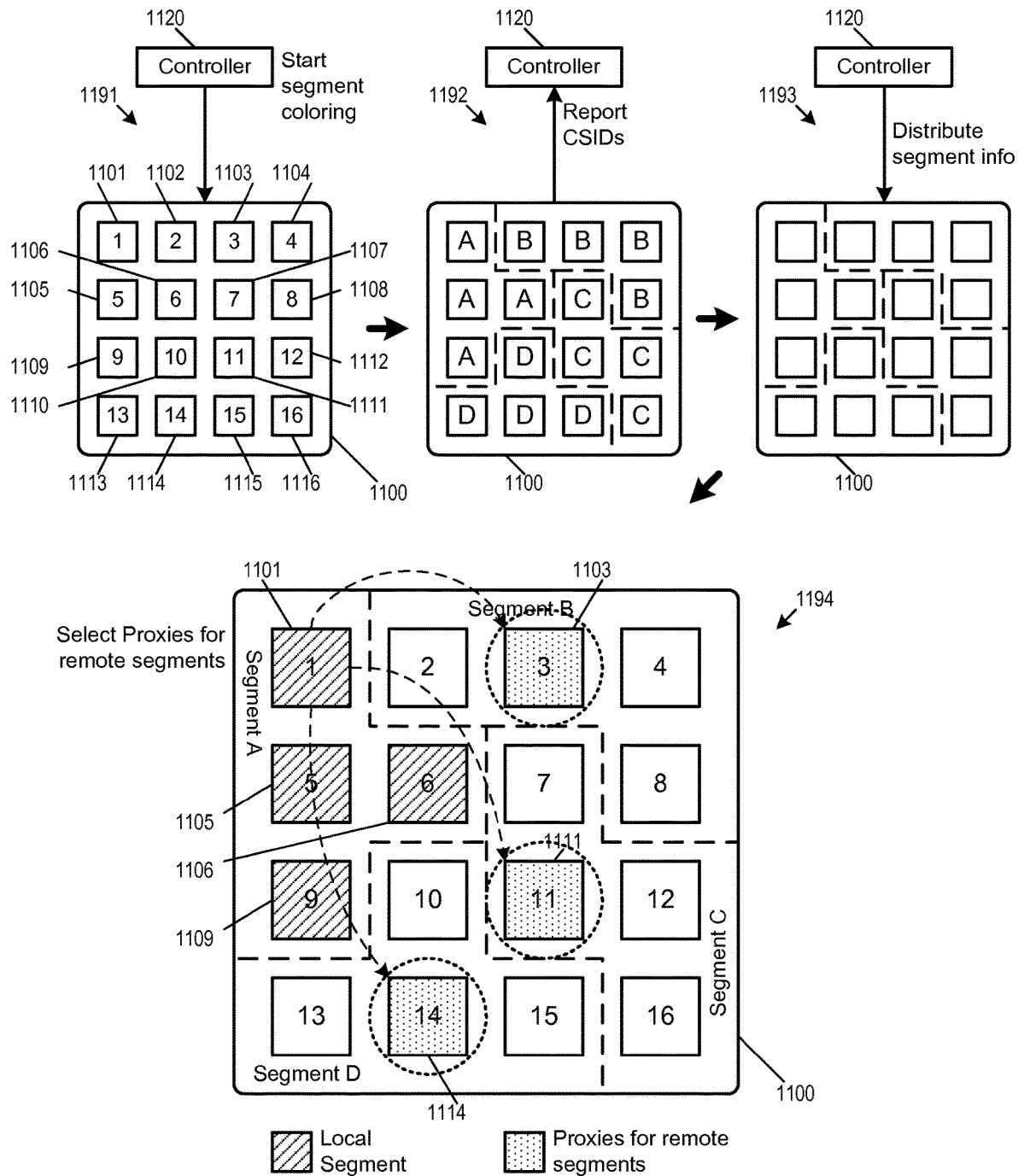
FIG. 11 illustrates the use of CSIDs for identifying connectivity segments and for performing multicast forwarding across different connectivity segments.

For some embodiments, FIG. 11 illustrates the use of CSIDs for identifying connectivity segments and for performing multicast forwarding across different connectivity segments. FIG. 11 illustrates a network 1100 that includes network elements 1101-1116 (labeled 1-16). Each of the network elements is capable of performing the segment coloring process as described in Section I for dynamically detecting connectivity segments in underlying physical network. The figure illustrates the use of CSID for multicast forwarding in four stages 1191-1194.

The first stage 1191 shows the network 1100 before the segment coloring process. None of the network elements 1101-1116 has been assigned a CSID, and the underlying connectivity for supporting BUM traffic is unknown. The stage 1101 also shows a network controller 1120 initiating the segment coloring process. In some embodiments (not illustrated), the network elements starts the segment coloring process automatically without receiving a command from an external controller.

The second stage 1192 shows the network 1100 after each network element has been assigned a CSID by the segment coloring process. As illustrated, the network elements 1101, 1105, 1106, 1109 have each set its CSID to "A", the network elements 1102, 1103, 1104, 1108 have each set its CSID to "B", the network elements 1107, 1111, 1112, 1116 have each set its CSID to "C", and the network elements 1110, 1113, 1114, 1115 have each set its CSID to "D". In other words, the network elements have identified connectivity segments "A", "B", "C", and "D" by segment coloring. Each of the network elements then reports its own CSID to the central controller 1120. It is worth noting that, in some embodiments, segment coloring is a dynamic and ongoing process for dynamically detecting any changes in the underlying physical network with regard to BUM traffic connectivity, and the network elements continues to perform segment coloring even after the reporting of the CSIDs.

The third stage 1193 shows the distribution of the connectivity segment information from the controller 1120 to the network elements 1101-1116 in the network 1100. In some embodiments, every network element receives the connectivity segment information. In some embodiments, only network elements that needs to perform multicast forwarding and replication receives the connectivity segment information. In some embodiments, only network elements that are multicast endpoints receive and use the connectivity segment information. Multicast endpoints are encapsulation network tunnel endpoints capable of multicast replication or forwarding.

The fourth stage 1194 shows the selection of proxies by one of the network elements 1101, which is a multicast endpoint. Since the network element 1101 has CSID "A", it recognizes other network elements having CSID "A" (i.e., network elements 1105, 1106, and 1109) as being in its local segment. The network element 1101 also uses CSIDs "B", "C", and "D" to recognize that the network elements 1102, 1103, 1104, and 1108 as belonging to a remote connectivity segment B, the network elements 1107, 1111, 1112, and 1116 as belonging to a remote connectivity segment C, and the network elements 1110, 1113, 1114, and 1115 as belonging to a remote connectivity segment D. The network element 1101 also selects the network element 1113 to be the proxy of segment B, the network element 1111 to be the proxy of segment C, and the network element 1114 to be the proxy of segment D. In some embodiments, the network elements selected to serve as proxies are also multicast endpoints.

In some embodiments, a multicast endpoint performs multicast replication itself in different modes depending on physical network topology and multicast capabilities. In some embodiments, a multicast endpoint is part of a hypervisor that sends and receives multicast traffic to and from a physical network on behalf of its virtual machines (VMs) running on a host machine. In some embodiments, a multicast endpoint can be an entity in a network segment that does not generate and consume multicast traffic. At least one of these multicast endpoints intercepts locally originated multicast traffic and replicates the intercepted traffic to multicast endpoints of remote segments. At least one of these multicast endpoints receives multicast traffic from remote segments and injects the received traffic to its local segment. U.S. patent application Ser. No. 14/020,369 describes multicast endpoints performing multicast forwarding across different segments of the network by selecting and using proxies in remote segments.

Figure 12:
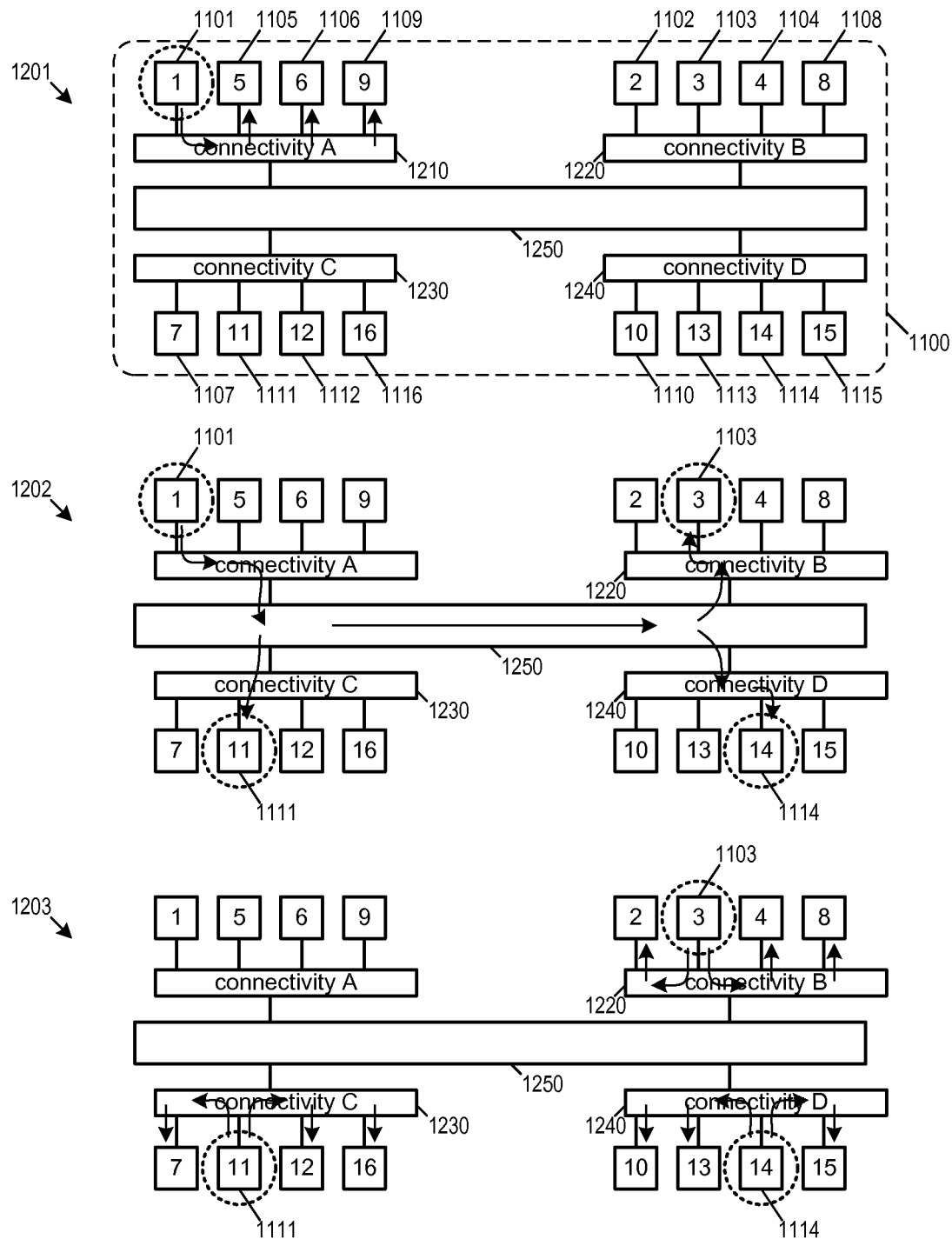
FIG. 12 illustrates multicast forwarding from a multicast endpoint to several network elements by using selected proxies.

In three stags 1201-1203, FIG. 12 illustrates multicast forwarding from the multicast endpoint 1101 to network elements 1102-1116 by using the selected proxies 1103, 1111, and 1114. The multicast forwarding uses the multicast capabilities of connectivity segments detected by the segment coloring process performed earlier. The segment coloring process has identified connectivity segments 1210 (segment A), 1220 (segment B), 1230 (segment C), and 1240 (segment D) in the network 1100. The remaining segment 1250 of the network that does not support BUM traffic.

The first stage 1201 shows the multicast endpoint 1101 using the multicast capability of its local segment 1210 to send a particular data packet to the network elements 1105, 1106, and 1109. The second stage 1202 shows the multicast endpoint 1101 forwarding the particular data packet to the proxies 1103, 1111, and 1114 through the segment 1250 of the network, whose underlying physical network does not support BUM traffic. In some embodiments, the forwarding of the data packet to the proxies is done by unicast traffic.

The third stage 1203 shows each of the proxies using the multicast capabilities of the detected connectivity segments to deliver the data packet to each recipient. Namely, the proxy 1103 uses the multicast capability of the segment B (1220) to send the data packet to network elements 1102, 1104, and 1108, the proxy 1111 uses the multicast capability of the segment C (1230) to send the data packet to network elements 1107, 1112, and 1116, the proxy 1114 uses the multicast capability of the segment D (1240) to send the data packet to network elements 1110, 1113, and 1115.

In some embodiments, though all network elements in a connectivity segment support multicast, some but not necessarily all of the network elements are multicast endpoints. In some embodiments, only multicast endpoints are capable of performing multicast forwarding or replication by selecting and using proxies, and only multicast endpoints are capable of serving as proxies for another multicast endpoint in another connectivity segment. However, for purpose of illustrative simplicity for FIGS. 13-15 below, network elements 1101-1116 are assumed to be multicast endpoints.

Furthermore, the network elements 1101-1116 are assumed to be multicast endpoints belonging to a same multicast group. However, in some embodiments, the network can include multiple distinct multicast groups. In some embodiments, different multicast groups are supported by the same underlying physical network support for multicast, and can hence use the same identification of connectivity segments. In some embodiments, different multicast groups may be defined according to different types of connectivity and hence would use different definitions of connectivity segments performed by different segment coloring processes.

In order to identify the remote connectivity segments as well as its own local segment, a multicast endpoint in some embodiments receives information for identifying connectivity segments that was reported by the network elements performing the segment coloring process. In some embodiments, the information includes a list of connectivity segments. In some embodiments, the information includes a list of network elements in the network, and each listed network element is associated with a connectivity segment identifier (CSID). In some embodiments, such information is reported to a central controller (e.g., 1120) and distributed to the multicast endpoints in the network.

Figure 13A:
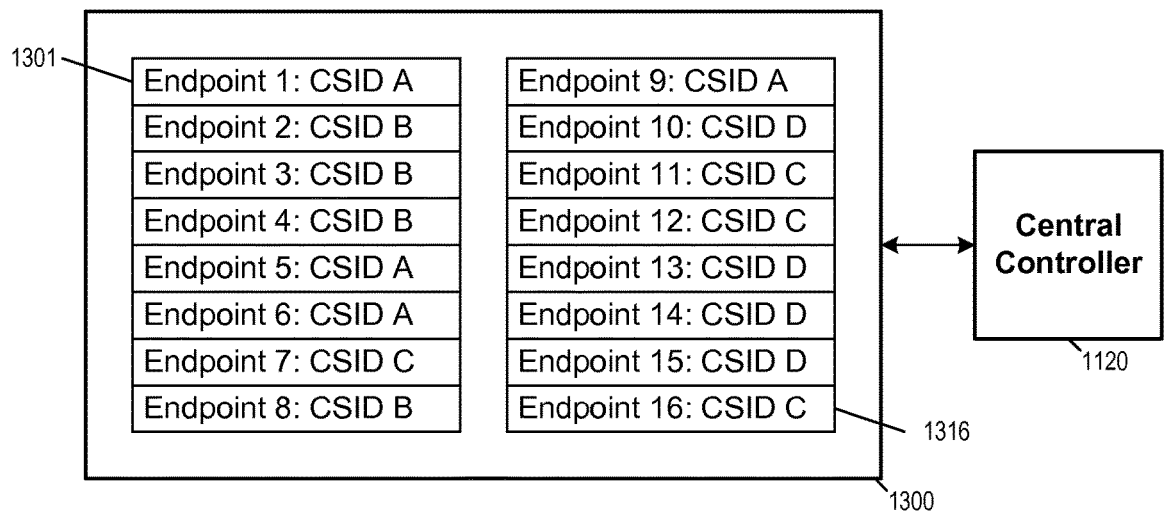
FIG. 13a illustrates an example of the information reported to a central controller for identifying connectivity segments in a network.

FIG. 13*a* illustrates an example of the information reported to the central controller 1120 for identifying connectivity segments in the network 1100. The information is conceptually illustrated in a table 1300 that lists all of the network elements in the network. 1100. In this particular example, each of the network elements 1101-1116 is also an encapsulation network endpoint. Each entry of the table 1300 lists an endpoint and the CSID associated with the endpoint. For example, the table entry 1301 indicates that the CSID of the network element 1101 is "A", while the table entry 1316 indicates that the CSID of the network element 1116 is "C". In some embodiments such as those illustrated by reference to FIG. 11, the table 1300 is pushed to individual multicast endpoints to facilitate the selection of proxies and the identification of local and remote segments.

Figure 13B:
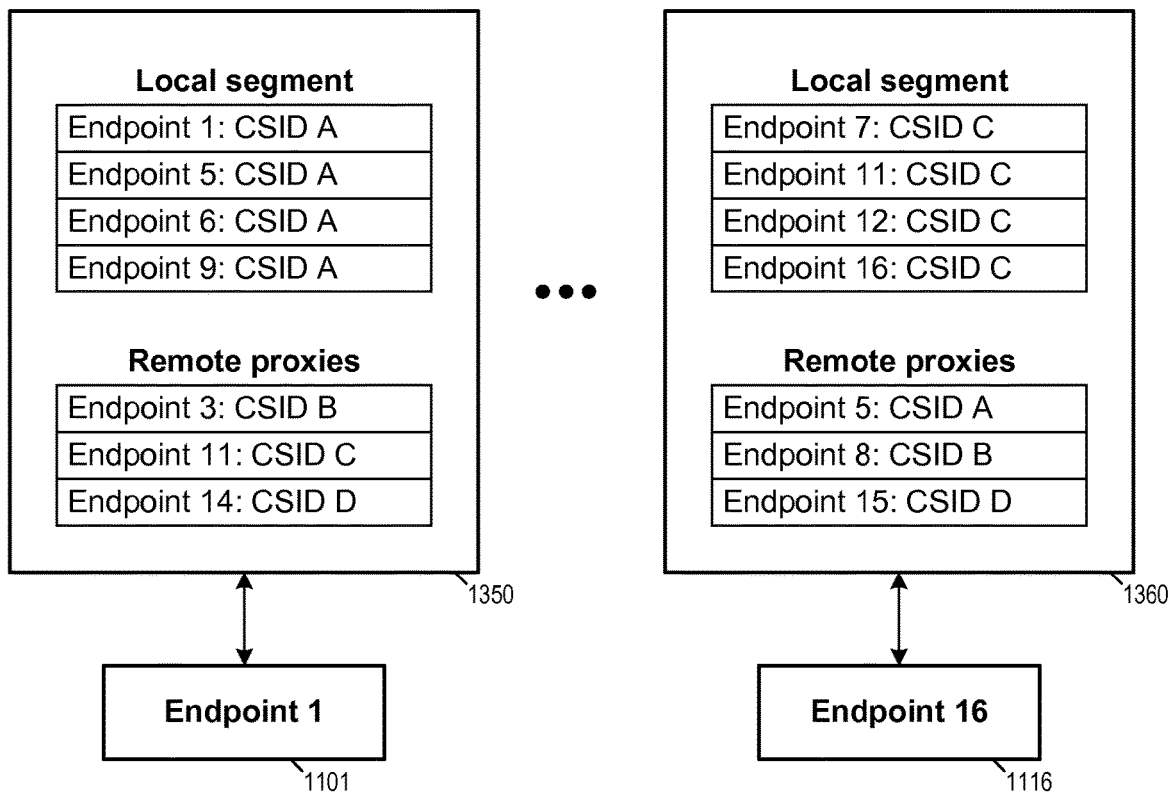
FIG. 13b illustrates an example of the records generated and maintained by each multicast endpoint based on the reported connectivity segments.

FIG. 13*b* illustrates an example of the records generated and maintained by each multicast endpoint based on the reported connectivity segments. In some embodiments, such records are based on the reported connectivity segment information (such as the table 1300). The figure illustrates a table 1350 maintained by the endpoint 1101 and a table 1360 maintained by the endpoint 1116.

The table 1350 indicates that the endpoint 1101 recognizes that the endpoints 1105, 1106, and 1109 (labeled 5, 6, 9) are in a same local connectivity segment (having CSID "A") as the endpoint 1101, i.e., these are the endpoints that can be reached by BUM traffic directly from the endpoint 1101 without going through a proxy. The table 1301 also indicates that the endpoint 1101 has chosen the endpoints 1103, 1111, and 1114 (labeled 3, 11, 14) to serve as its proxies for multicast replication in connectivity segments "B", "C", and "D" respectively. Likewise, the table 1360 indicates that the endpoint 1116 recognizes that the endpoints 1107, 1111, and 1112 (labeled 7, 11, and 12) are in the same local connectivity segment (having CSID "C") as the endpoint 1116, and that the endpoint 1116 has chosen the endpoints 1105, 1108, and 1115 (labeled 5, 8, 15) to serve as its proxies for multicast replication in connectivity segments "A", "B", and "D" respectively.

In some embodiments, at least some of the multicast endpoints are host machines running virtualization software or hypervisors. The virtualization software operating in a host machines allows it to simultaneously operate several virtual machines. Furthermore, in some embodiments, the virtualization software supports network virtualization such that the host machine running the virtualization software can support network traffic forwarding for multiple different logical networks. A host machine in some of these embodiments can operate multiple VMs belonging to different logical networks. In some embodiments, a host machine selects a different set of proxies for each of the different logical networks that it supports.

Figure 14:
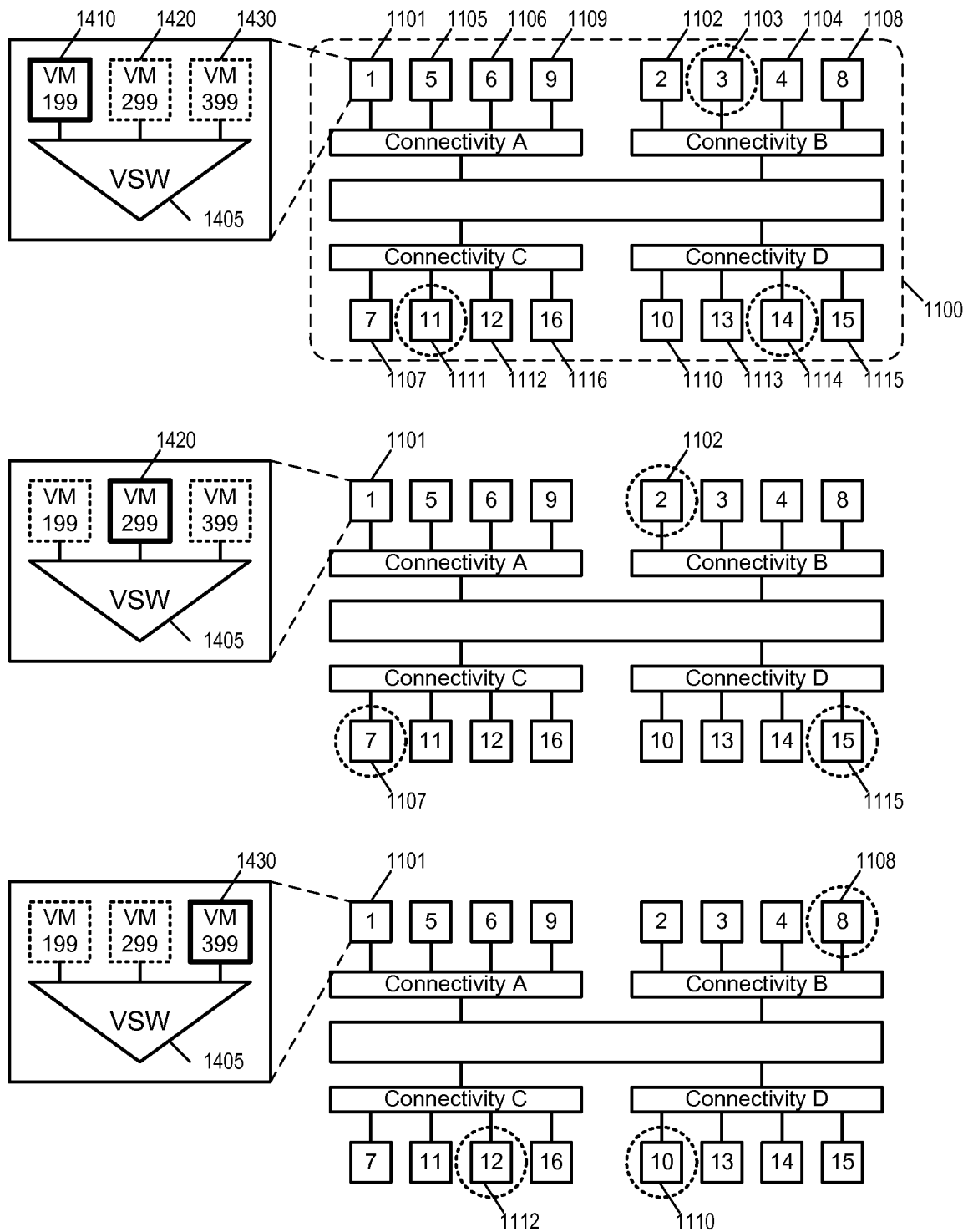
FIG. 14 illustrates the selection of different sets of proxies for different logical networks by a given host machine.

FIG. 14 illustrates the selection of different sets of proxies for different logical networks by a given host machine. Specifically, FIG. 14 illustrates logical networks 199, 299 and 399 operating in the network 1100. In some embodiments, at least some of the logical networks are encapsulation networks such as VXLAN or VLAN. In some of these embodiments, each encapsulation network uses a multicast group for performing broadcast to VMs within the encapsulation network. The network elements 1101-1116 of the network 1100 has performed segment coloring process and identified the connectivity segments 1210, 1220, 1230, and 1240 (A, B, C, and D) as well as the section 1250 that does not support BUM traffic connectivity.

The network element 1100 is a host machine that is operating a hypervisor (i.e., virtualization software) 1405, which allows the host machine to host three VMs 1410, 1420, and 1430. The virtualization software 1405 also supports network traffic for logical networks 199, 299, and 399, respectively. The virtualization software 1405 connects the VMs 1410, 1420, and 1430 to the logical networks 199, 299, and 399, respectively.

FIG. 14 also illustrates the selection of different sets of proxies by the host machine 1100 for the logical networks 199, 299 and 399. The host machine 1100 selects a different set of proxies for each of its different logical networks. For the logical network 199, the host machine 1101 selects multicast endpoints (also host machines in some embodiments) 1103, 1111, and 1114 as proxies for connectivity segments B, C, and D respectively. For the logical network 299, the host machine 1101 selects multicast endpoints 1102, 1107, and 1115 as proxies for connectivity segments B, C, and D respectively. For the logical network 399, the host machine 1101 selects multicast endpoints 1108, 1112, and 1110 as proxies for connectivity segments B, C, and D respectively. In other words, for BUM traffic from the VM 1410, the host machine 1101 uses the set of proxies selected for the logical network 199 (i.e., multicast endpoints 1103, 1111, and 1114); for BUM traffic from the VM 1420, the host machine 1101 uses the set of proxies selected for the logical network 299 (i.e., multicast endpoints 1102, 1107, and 1115); and for BUM traffic from the VM 1423, the host machine 1101 uses the set of proxies selected for the logical network 399 (i.e., multicast endpoints 1108, 1112, and 1110).

Figure 15:
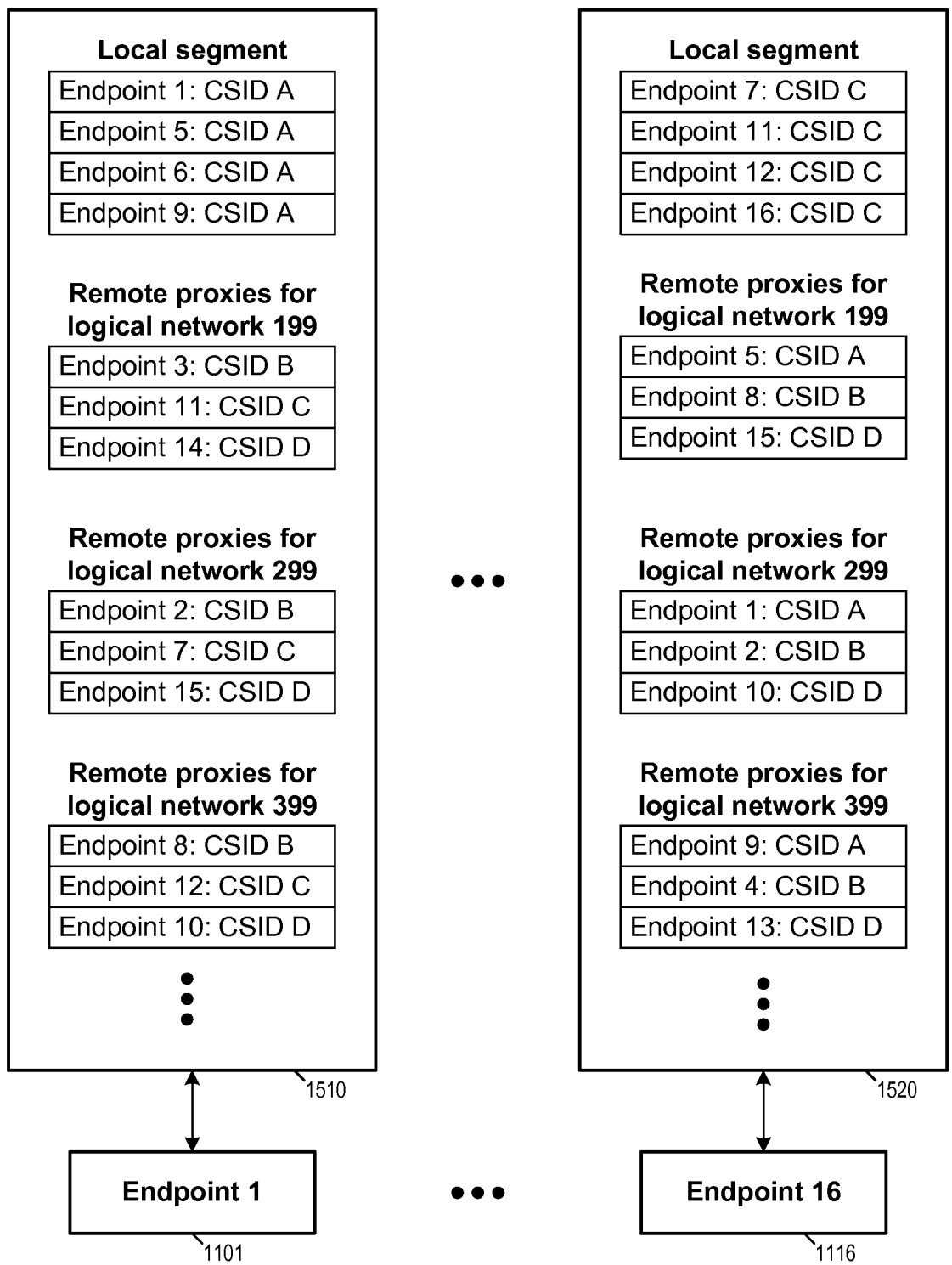
FIG. 15 illustrates an example of records generated and maintained by multicast endpoints in order to support multiple different logical networks.

FIG. 15 illustrates an example of the records generated and maintained by multicast endpoints in order to support multiple different logical networks. Specifically, FIG. 15 illustrates the records 1510 and 1520 generated and maintained by the host machines 1101 and 1116, respectively. The records 1510 and 1520 are similar to the records 1310 and 1320 in that they record the selection of proxies for each connectivity segments by the host machines that maintain them. However, the records 1510 and 1520 maintains a set of proxy selections for each of the logical networks 199, 299, and 399.

In some embodiments, the selection of remote multicast endpoints as proxies for each logical network is performed by the hypervisors running in the host machines (such as the hypervisor 1405 of the host machine 1101). In some embodiments, such selection is performed by a central controller. In some embodiments, proxies are selected in order to promote load balancing, e.g., to avoid causing too much traffic to have to go through a same remote host machine. In some embodiments, this load balancing is based on static and/or dynamic analysis of network traffic of the physical network (and hence encompassing all logical networks). In some embodiments, the selection of proxies is entirely random in order to avoid biasing in network load distribution due to incomplete traffic data.

In some embodiments, different logical networks are supported by the same underlying physical network support for multicast, and can hence use the same identification of connectivity segments. In some embodiments, different logical networks may be defined according to different types of connectivity and hence would use different definitions of connectivity segments performed by different segment coloring processes.

Figure 16:
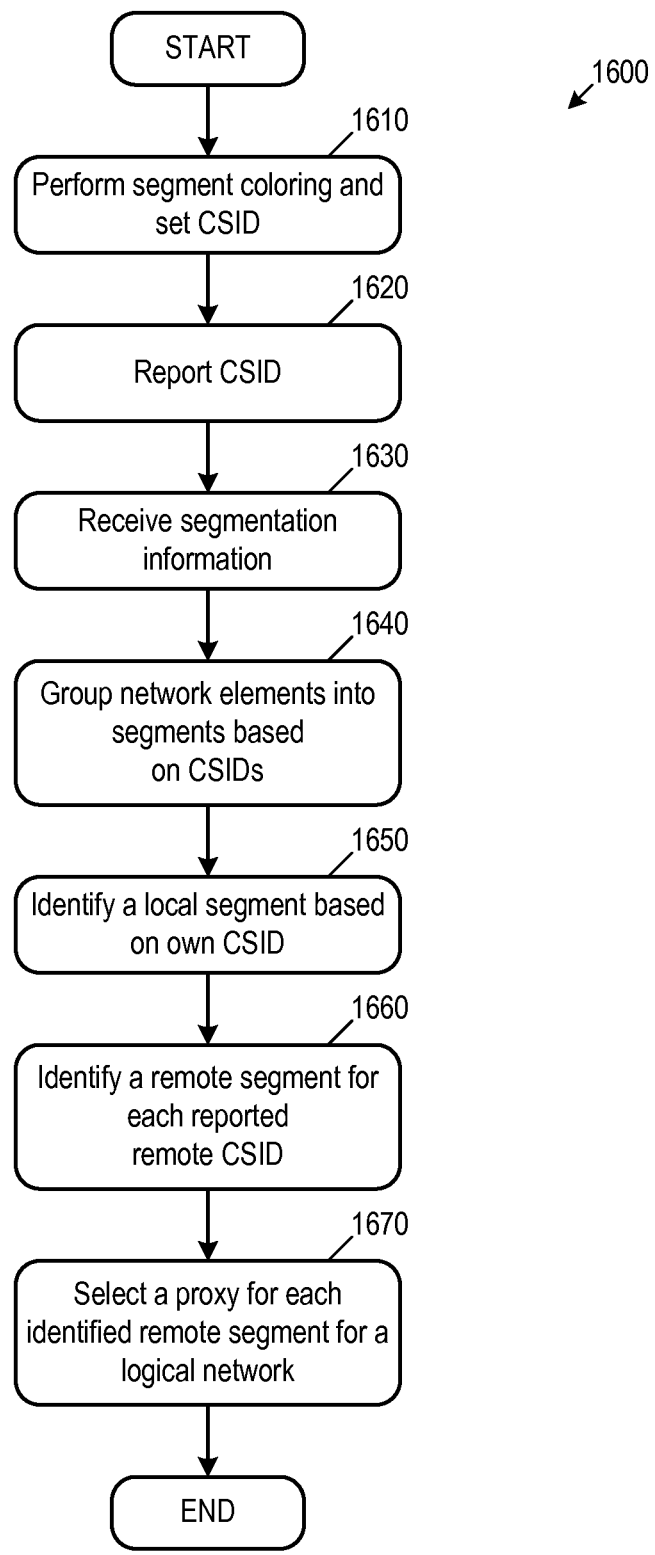
FIG. 16 conceptually illustrates a process for performing multicast replication across a network that support BUM traffic only in some segments of the network.

For some embodiments, FIG. 16 conceptually illustrates a process 1600 for performing multicast replication across a network that support BUM traffic only in some segments of the network (e.g., the network 100 or the network 1100). The process 1600 performs multicast proxy selection based on connectivity segments identified by the segment coloring operations described above in Section I. In some embodiments, the process 1600 is performed by individual multicast endpoints that both participates in segment coloring and in multicast replication.

The process 1600 starts by performing (at 1610) segment coloring process for identifying connectivity segments and selecting/setting/adopting/generating CSIDs. Specifically, a multicast endpoint performing this operation sends and receives query and/or response messages for a CSID. In some embodiments, the multicast endpoint performs at least some of the operations described above by reference to FIGS. 6 and 9. The process then reports (at 1620) the CSID that it has set from the segment coloring operation. In some embodiment, the segment coloring operation is a continuous operation that dynamically detects changes in the network, and the process in some of these embodiments reports these changes by reporting changes in CSID. In some embodiments, this CSID is reported to a central controller before being distributed to the multicast endpoints as described above by reference to FIG. 11. In some embodiments, the CSID are reported directly to other multicast endpoints.

Next, the process receives (at 1630) the connectivity segment identification information, namely the CSIDs of the various multicast endpoints in the network. In some embodiments, this information includes a list of the elements in the physical network as well as the CSID of each network element. An example of such information (e.g., the table 1300) is described by reference to FIG. 13a above. The process then groups (at 1640) network elements into connectivity segments based their CSIDs. In some embodiments, the connectivity segment information is reported to the central controller, and the central controller in turn selects the proxies for each of the multicast endpoints. In some embodiments, this information is distributed to the individual multicast endpoints so each decides on its own sets of multicast proxies.

The process then identifies (at 1650) a local segment based on the reported CSIDs. For example, the network element 1116 is able to determine from the table 1300 that the endpoints 1107, 1111, 1112 (labeled 7, 11, 12) are in the local segment of 1116 because they all share the same CSID of "C". The network element 1116 in turns knows that the underlying physical network supports BUM connectivity between the endpoints 1107, 1111, 1112, and 1116 so that proxies are not needed within the local segment.

The process next identifies (at 1660) a remote segment for each reported remote CSID. For example, the network element 1116 is able to determine from the table that CSIDs "A", "B", and "D" represent connectivity segments that are not of the network element 1116 (which is "C"). Those segments are therefore identified as remote segments that the BUM traffic from the network element 1116 cannot directly reach.

Next, the process selects (at 1670) a proxy for each identified remote segment in order to utilize the multicast capabilities of underlying physical network of those remote segments. Furthermore, for some embodiments that support multiple logical networks in a host machine, the process selects a different set of proxies for each logical network. For example, as illustrated in FIG. 15, the network element 1116 selects multicast endpoints 1105, 1108, and 1115 as proxies for logical network 199, multicast endpoints 1101, 1102, and 1110 as proxies for logical network 299, and multicast endpoints 1109, 1104, and 1113 as proxies for logical network 399. In some embodiments, the process selects a different a set of proxies for each logical network according to the logical network's own unique set of constraints. After selecting the proxies, the process 1600 ends.

III. Software Architecture

Figure 17:
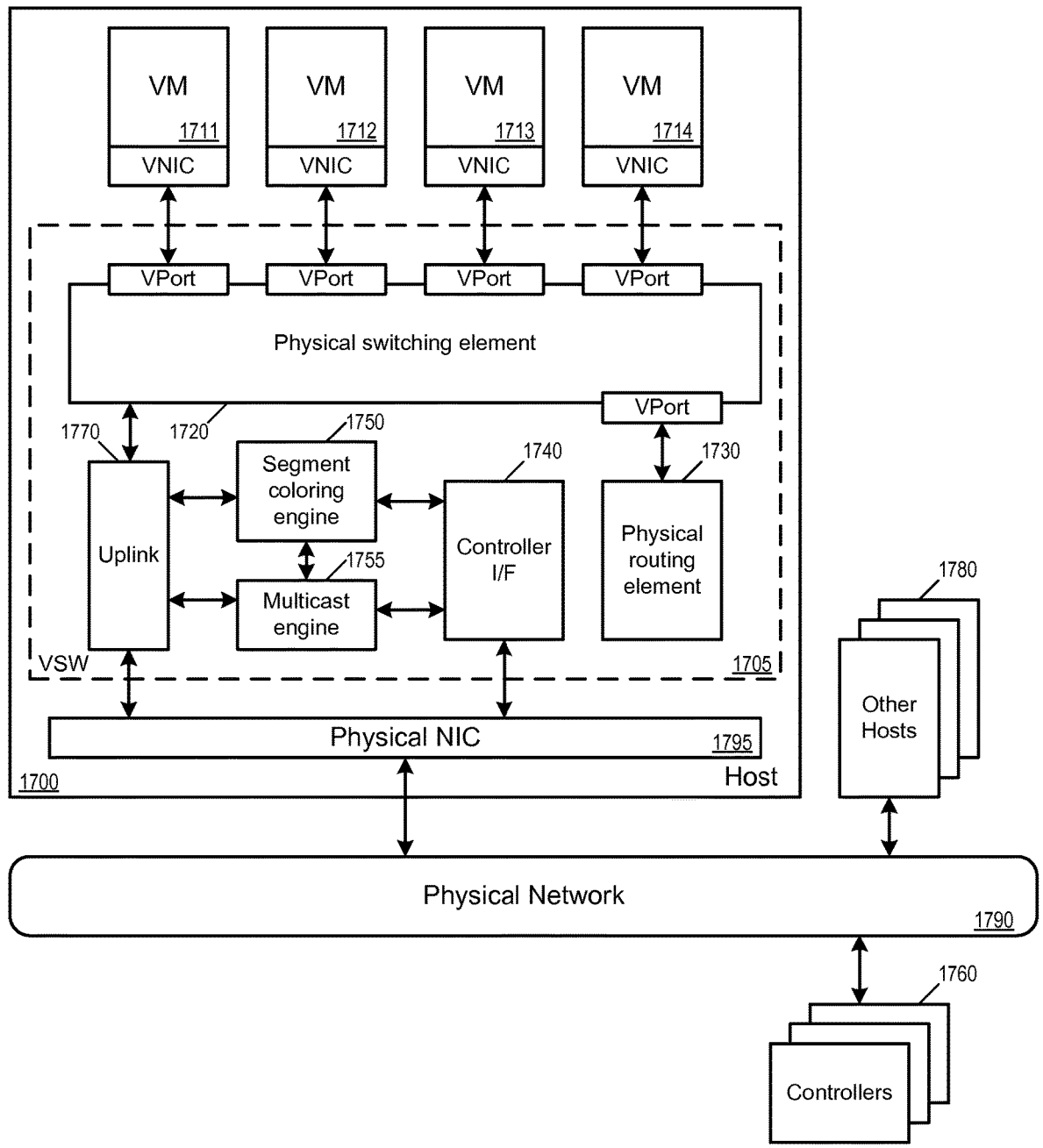
FIG. 17 illustrates an example host machine that is operating virtualization software.

As mentioned earlier, some embodiments of the invention are implemented by virtualization software or hypervisors running on host machines. For some embodiments, FIG. 17 illustrates an example host machine 1700 that is operating virtualization software 1705. The virtualization software 1705 allows the host machine to host virtual machines 1711-1714 as well as connecting the virtual machines to a physical network 1790. This physical network 1790 may span one or more data centers and include various physical switches and routers, and not all of the devices that constitute the physical network 1790 support BUM traffic.

As illustrated, the host machine 1700 has access to the physical network 1790 through a physical NIC (PNIC) 1795. The virtualization software 1705 serves as the interface between the hosted VMs 1711-1714 and the physical NIC 1795 (as well as other physical resources, such as processors and memory). Each of the VMs includes a virtual NIC (VNIC) for accessing the network through the virtualization software 1705. Each VNIC in a VM is responsible for exchanging packets between the VM and the virtualization software 1705. In some embodiments, the VNICs are software abstractions of physical NICs implemented by virtual NIC emulators.

The virtualization software 1705 manages the operations of the VMs 1711-1714, and includes several components for managing the access of the VMs to the physical network (by implementing the logical networks to which the VMs connect, in some embodiments). As illustrated, the virtualization software 1705 includes a physical switching element 1720, a physical routing element 1730, a controller interface 1740, an uplink module 1770, a segment coloring engine 1750, and a multicast engine 1755.

The controller interface 1740 receives control plane messages from a controller or a cluster of controllers 1760. In some embodiments, these control plane message includes configuration data for configuring the various components of the virtualization software and/or the virtual machines (such as the physical switching element 1720 and the physical routing element 1750). In some embodiments, the control plane messages also includes connectivity segment information or multicast proxy selection information. In some embodiments, the controller interface 1740 reports the CSID adopted by the host machine to the controllers 1760 and provides the received connectivity segment information to the segment coloring engine 1750.

The segment coloring engine 1750 is for performing the segment identification as described in Section I above. In some embodiments, the segment coloring engine 1750 uses the uplink module 1770 to inject query and response messages onto the physical network for other host machines 1780 according to the segment coloring protocol. From these query and response messages, the segment coloring engine 1750 either generates a CSID as the assignor of the connectivity segment or adopt a CSID according to received response messages.

The multicast engine 1755 allows the host machine 1700 to be a multicast endpoint and to perform multicast communication as described in Section II above. The multicast engine 1755 communicates with the uplink module 1770 to forward multicast traffic to host machines in local segment. The multicast engine 1755 also reformats multicast traffic into unicast traffic for delivery to multicast proxies in remote segments. In some embodiments, the multicast engine 1755 also performs proxy selection based on reported CSIDs from other host machines in the network. Though illustrated as two separate modules, the multicast engine 1755 and the segment coloring engine 1750 are parts of a same module within the virtualization software 1705 in some embodiments.

The physical switching element 1720 delivers network data to and from the physical NIC 1795, which interfaces the physical network 1790. The physical switching element also includes a number of virtual ports (vPorts) that communicatively interconnects the physical NIC with the VMs 1711-1714, the physical routing element 1730 and the controller interface 1740. Each virtual port is associated with a unique L2 MAC address, in some embodiments. The physical switching element performs L2 link layer packet forwarding between any two network elements that are connected to its virtual ports. The physical switching element also performs L2 link layer packet forwarding between any network element connected to any one of its virtual ports and a reachable L2 network element on the physical network 1790 (e.g., another VM running on another host).

The physical routing element 1730 performs L3 routing (e.g., by performing L3 IP address to L2 MAC address resolution) on data packets received from a virtual port on the physical switching element 1720. Each routed data packet is then sent back to the physical switching element 1720 to be forwarded to its destination according to the resolved L2 MAC address. This destination can be another VM connected to a virtual port on the physical switching element 1720, or a reachable L2 network element on the physical network 1790 (e.g., another VM running on another host, a physical non-virtualized machine, etc.).

The uplink module 1770 relays data between the physical switching element 1720 and the physical NIC 1795. In some embodiments, the uplink module 1770 allows the host machine 1700 to serve as a tunnel endpoint for encapsulation overlay networks such as VXLAN and VLANs. VXLAN is an overlay network encapsulation protocol. An overlay network created by VXLAN encapsulation is sometimes referred to as a VXLAN network, or simply VXLAN. When a VM on the host 1700 sends a data packet (e.g., an ethernet frame) to another VM in the same VXLAN network but on a different host, the uplink module 1770 encapsulates the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The uplink module 1770 also decapsulates incoming VXLAN packets and forwards only the original inner data packet to the destination VM.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 18:
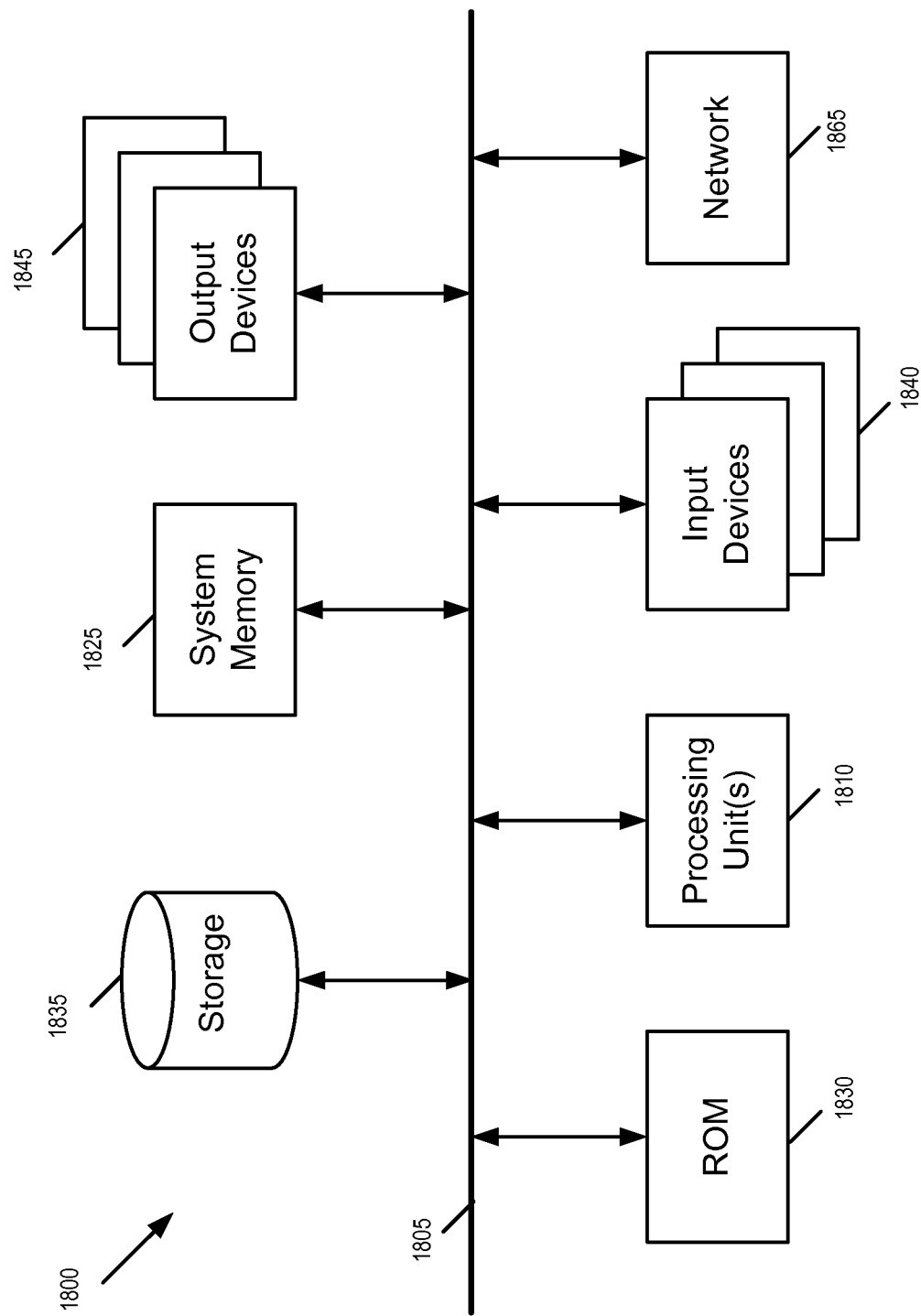
FIG. 18 conceptually illustrates an electronic system with which some embodiments of the invention are implemented.

FIG. 18 conceptually illustrates an electronic system 1800 with which some embodiments of the invention are implemented. The electronic system 1800 can be used to execute any of the control, virtualization, or operating system applications described above. The electronic system 1800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1800 includes a bus 1805, processing unit(s) 1810, a system memory 1825, a read-only memory 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the read-only memory 1830, the system memory 1825, and the permanent storage device 1835.

From these various memory units, the processing unit(s) 1810 retrieves instructions to execute and data to process in order to execute the processes of the invention. The processing unit(s) may be a single processor or a multi-core processor in different embodiments.

The read-only-memory (ROM) 1830 stores static data and instructions that are needed by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the invention use a mass-storage device (such as a magnetic or optical disk and its corresponding disk drive) as the permanent storage device 1835.

Other embodiments use a removable storage device (such as a floppy disk, flash drive, etc.) as the permanent storage device. Like the permanent storage device 1835, the system memory 1825 is a read-and-write memory device. However, unlike storage device 1835, the system memory is a volatile read-and-write memory, such a random access memory. The system memory stores some of the instructions and data that the processor needs at runtime. In some embodiments, the invention's processes are stored in the system memory 1825, the permanent storage device 1835, and/or the read-only memory 1830. From these various memory units, the processing unit(s) 1810 retrieves instructions to execute and data to process in order to execute the processes of some embodiments.

The bus 1805 also connects to the input and output devices 1840 and 1845. The input devices enable the user to communicate information and select commands to the electronic system. The input devices 1840 include alphanumeric keyboards and pointing devices (also called "cursor control devices"). The output devices 1845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 18, bus 1805 also couples electronic system 1800 to a network 1865 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 6, 9, and 16) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for identifying a network segment comprising a first network node and a plurality of additional network nodes, the method to be performed by the first network node, the first network node storing a first identifier as identifying the network segment, the method comprising:
   sending, to the plurality of additional network nodes, a first message that indicates the first identifier as a network segment identifier;
   in response to receiving a second message, sent by a first of the additional network nodes and comprising a second identifier for identifying the network segment, continuing to use the stored first identifier to identify the network segment based on the received second identifier ranking lower than the stored first identifier; and
   in response to receiving a third message, sent by a second of the additional network nodes and comprising a third identifier for identifying the network segment, replacing the first identifier with the third identifier as identifying the network segment based on the received third identifier ranking higher than the stored first identifier.

2. The method of claim 1, wherein the network segment comprises network nodes with connectivity using a particular protocol.

3. The method of claim 2, wherein the first, second, and third messages are sent using the particular protocol.

4. The method of claim 3, wherein the particular protocol comprises a broadcast protocol.

5. The method of claim 3, wherein the particular protocol comprises a multicast protocol.

6. The method of claim 3, wherein the particular protocol comprises a broadcast, unknown unicast, multicast (BUM) protocol.

7. The method of claim 1, wherein the first identifier is based on a subnet address of a node in the network segment.

8. The method of claim 1, wherein the rank of an identifier is based on a machine access control (MAC) address of a particular network node from which the identifier is received.

9. The method of claim 8, wherein sending the first message comprises sending the first message when a particular timer expires.

10. The method of claim 9 further comprising resetting the particular timer each time the first message is sent.

11. A non-transitory machine readable medium storing a program which when executed on a set of processing units of a first network node identifies a network segment comprising the first network node and a plurality of additional network nodes, the first network node storing a first identifier as identifying the network segment, the program comprising sets of instructions for:
   sending, to the plurality of additional network nodes, a first message that indicates the first identifier as a network segment identifier;
   receiving a second message, sent by one of the additional network nodes, comprising a second identifier for identifying the network segment;
   when the received second identifier ranks higher than the stored first identifier, replacing the first identifier with the second identifier as identifying the network segment; and when the received second identifier ranks lower than the stored first identifier, continuing to use the stored first identifier to identify the network segment.

12. The non-transitory machine readable medium of claim 11, wherein the network segment comprises network nodes with connectivity using a particular protocol.

13. The non-transitory machine readable medium of claim 12, wherein the first and second messages are sent using the particular protocol.

14. The non-transitory machine readable medium of claim 13, wherein the particular protocol comprises a broadcast protocol.

15. The non-transitory machine readable medium of claim 13, wherein the particular protocol comprises a multicast protocol.

16. The non-transitory machine readable medium of claim 13, wherein the particular protocol comprises a broadcast, unknown unicast, multicast (BUM) protocol.

17. The non-transitory machine readable medium of claim 11, wherein the first identifier is based on a subnet address of a node in the network segment.

18. The non-transitory machine readable medium of claim 11, where sending the first message comprises sending the first message when a particular timer expires.

19. The non-transitory machine readable medium of claim 18 further comprising resetting the particular timer each time the first message is sent.

20. The non-transitory machine readable medium of claim 19, further comprising resetting the particular timer when the second identifier of the second message is identical to the first identifier.

21. The non-transitory machine readable medium of claim 11, wherein the network segment is a first network segment and a current identifier is used by at least one node in at least a second network segment (1) to identify the first network segment as being a remote network segment and (2) to select a node associated with the current identifier as a proxy for multicast forwarding in the first network segment for multicast packets originating in the second network segment.

* * * * *